US009943155B2

(12) United States Patent
Hori

(10) Patent No.: US 9,943,155 B2
(45) Date of Patent: Apr. 17, 2018

(54) DRAWING APPARATUS, DRAWING METHOD FOR DRAWING APPARATUS, AND COMPUTER READABLE RECORDING MEDIUM

(71) Applicant: CASIO COMPUTER CO., LTD., Shibuya-ku, Tokyo (JP)

(72) Inventor: Masahiro Hori, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/466,595

(22) Filed: Mar. 22, 2017

(65) Prior Publication Data

US 2017/0273433 A1 Sep. 28, 2017

(30) Foreign Application Priority Data

Mar. 25, 2016 (JP) ................................ 2016-062011
Jun. 29, 2016 (JP) ................................ 2016-128341

(51) Int. Cl.

| | |
|---|---|
| ***G06K 15/22*** | (2006.01) |
| ***A45D 29/00*** | (2006.01) |
| ***A45D 34/04*** | (2006.01) |
| ***B41J 3/407*** | (2006.01) |

(52) U.S. Cl.
CPC ............ *A45D 29/00* (2013.01); *A45D 34/04* (2013.01); *B41J 3/4073* (2013.01)

(58) Field of Classification Search
None
See application file for complete search history.

(56) References Cited

U.S. PATENT DOCUMENTS 6,035,860 A * 3/2000 Mombourquette .... A45D 29/00 132/200
6,286,517 B1 * 9/2001 Weber .................... A45D 29/00 132/200
6,336,694 B1 * 1/2002 Ishizaka ................ A45D 29/00 347/105
6,461,305 B1 * 10/2002 Schnall ............. A61B 5/02007 600/342
6,916,289 B2 7/2005 Schnall
9,712,727 B2 * 7/2017 Yamasaki ............. H04N 5/225
2002/0072681 A1 * 6/2002 Schnali ............. A61B 5/02007 600/507
2005/0187438 A1 * 8/2005 Xie .................... A61B 5/14532 600/310
2007/0027373 A1 * 2/2007 Xie .................... A61B 5/14532 600/316
2007/0092634 A1 * 4/2007 Zhang .................... A45D 29/00 427/1

(Continued)

FOREIGN PATENT DOCUMENTS

JP 10198785 A 7/1998
JP 2001070264 A 3/2001

(Continued)

*Primary Examiner* — Ted Barnes
(74) *Attorney, Agent, or Firm* — Holtz, Holtz & Volek PC

(57) ABSTRACT

A drawing apparatus includes an object receiver into which an object is inserted, the object being at least one finger or toe having a nail to be drawn, an object holder that is configured to hold the object inserted into the object receiver and processor. The processor is configured to adjust a holding level by the object holder on the basis of a size of the object.

20 Claims, 12 Drawing Sheets

(56) References Cited

U.S. PATENT DOCUMENTS

2014/0107697 A1* 4/2014 Patani .................... A61B 17/12
606/208

FOREIGN PATENT DOCUMENTS

| | | | |
|---|---|---|---|
| JP | 2002517270 | A | 6/2002 |
| JP | 3370345 | B2 | 1/2003 |
| JP | 2003534083 | A | 11/2003 |
| JP | 2012152410 | A | 8/2012 |
| JP | 2014138887 | A | 7/2014 |

* cited by examiner

| PRINT FINGER LATERAL WIDTH | FINGER WIDTH LEVEL |
|---|---|
| W<12mm | SIZE 1 |
| 12mm≦W≦16mm | SIZE 2 |
| 16mm<W | SIZE 3 |

FIG. 4

| FINGER WIDTH LEVEL | PRESSURE LEVEL (mmHg) |
|---|---|
| SIZE 1 | 200 |
| SIZE 2 | 150 |
| SIZE 3 | 100 |

FIG. 5

| FINGER WIDTH LEVEL | HEIGHT LEVEL (mm) |
| --- | --- |
| SIZE 1 | 7 |
| SIZE 2 | 12 |
| SIZE 3 | 17 |

FIG. 12

DRAWING APPARATUS, DRAWING METHOD FOR DRAWING APPARATUS, AND COMPUTER READABLE RECORDING MEDIUM

CROSS-REFERENCE TO RELATED APPLICATIONS

This application is based upon and claims the benefit of priority from the prior Japanese Patent Application No. 2016-128341, filed Jun. 29, 2016, the entire contents of which are incorporated herein by reference.

BACKGROUND OF THE INVENTION

1. Field of the Invention

The present invention relates to a drawing apparatus, a drawing method for a drawing apparatus, and a computer readable recording medium.

Conventionally, drawing apparatuses for drawing nail designs on nails are known (e.g. see Japanese Unexamined Patent Application Publication (Translation of PCT Application) No. 2003-534083).

However, hands are in an unstable state if the finger of the nail on which the drawing is to be performed is simply placed on a mounting stand. Consequently, the finger may move during the drawing, resulting in a shift in the drawing position, and there is a possibility that the finish of the nail printing will not be beautiful.

On this point, conventionally, in drawing apparatuses for drawing a nail design on a nail, products are known in which a print finger is held by a finger holding tool such as a holder or the like so as to immobilize the print finger during the drawing (e.g. see Japanese Unexamined Patent Application Publication (Translation of PCT Application) No. 2003-534083).

However, conventional finger holding tools such as holders and the like are made from hard plastic materials and the like and, consequently, having a finger held using such a finger holding tool during the nail printing is painful to the user and is a source of hardship and discomfort.

Additionally, fingers and toes of humans vary in size and thickness depending on the finger or toe, from the thumb or big toe to the little finger or little toe. Moreover, sizes and the like of the same finger or toe vary from person to person.

Consequently, in cases where a single apparatus is used to apply drawings to a plurality of fingers, a plurality of users attempts to perform drawing using a single apparatus, and the like, if the fingers are attempted to be held using the same finger holding tool, the size of the finger holding tool may not fit. For example, a thick finger or toe such as a thumb may be squeezed too tightly and the user may experience pain or, conversely, a thin finger or toe such as a little finger may not be sufficiently held and positional deviation may occur during drawing, which are problems.

Even if the finger holding tool is configured such that the degree of squeezing of the finger is adjustable, this is inconvenient because it takes time and effort for the user to adjust to a suitable degree of squeezing each time nail printing is to be performed.

In light of the problems described above, an object of the present invention is to provide a drawing apparatus; a drawing method for a drawing apparatus; and a computer readable recording medium whereby fingers and toes of various sizes can be reliably held while reducing hardship on the hand, finger, and the like of the user, and precise nail printing can be performed on a nail.

SUMMARY OF THE INVENTION

The present invention employs the following configuration to solve the problems described above.

According to the present invention, fingers and toes of various sizes can be reliably held while reducing hardship on the hand, finger, and the like of the user, and precise nail printing can be performed on a nail.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a drawing showing an example of a table that defines correspondence between finger width sizes and finger width levels.

FIG. 5 is a drawing showing an example of a table that defines correspondence between finger width levels and pressure levels.

FIG. 12 is a drawing showing an example of a table that defines correspondence between finger width levels and height levels.

FIRST EMBODIMENT

Figure 1B:
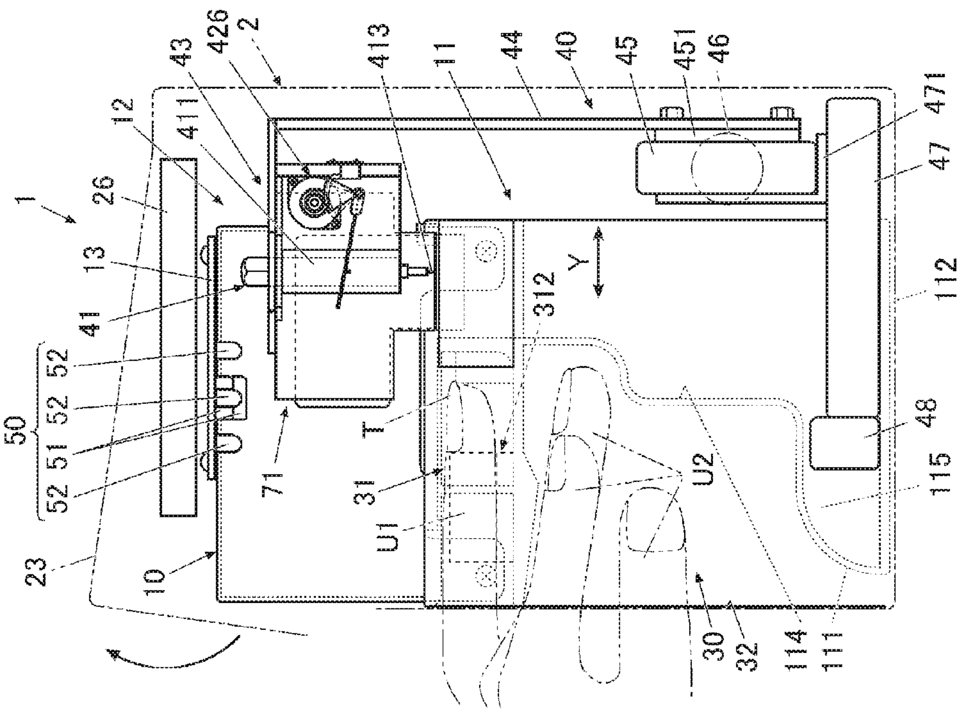
FIG. 1B is a side view illustrating an internal configuration of the drawing apparatus illustrated in FIG. 1A.

A first embodiment of the nail printing apparatus (drawing apparatus) and drawing method for the nail printing apparatus (drawing apparatus) according to the present invention are described below while referring to FIG. 1A to FIG. 8.

While various limitations, which are technically preferable from the perspective of carrying out the present invention, are placed on the embodiment described below, the scope of the present invention should not be construed to be limited to the embodiment or the examples illustrated in the drawings.

Additionally, in the following embodiments, a nail printing apparatus 1 will be described as an apparatus for drawing on a drawing object, namely a fingernail. However, the drawing object of the present invention is not limited to fingernails, and for example, the drawing object may be a toenail.

Figure 1A:
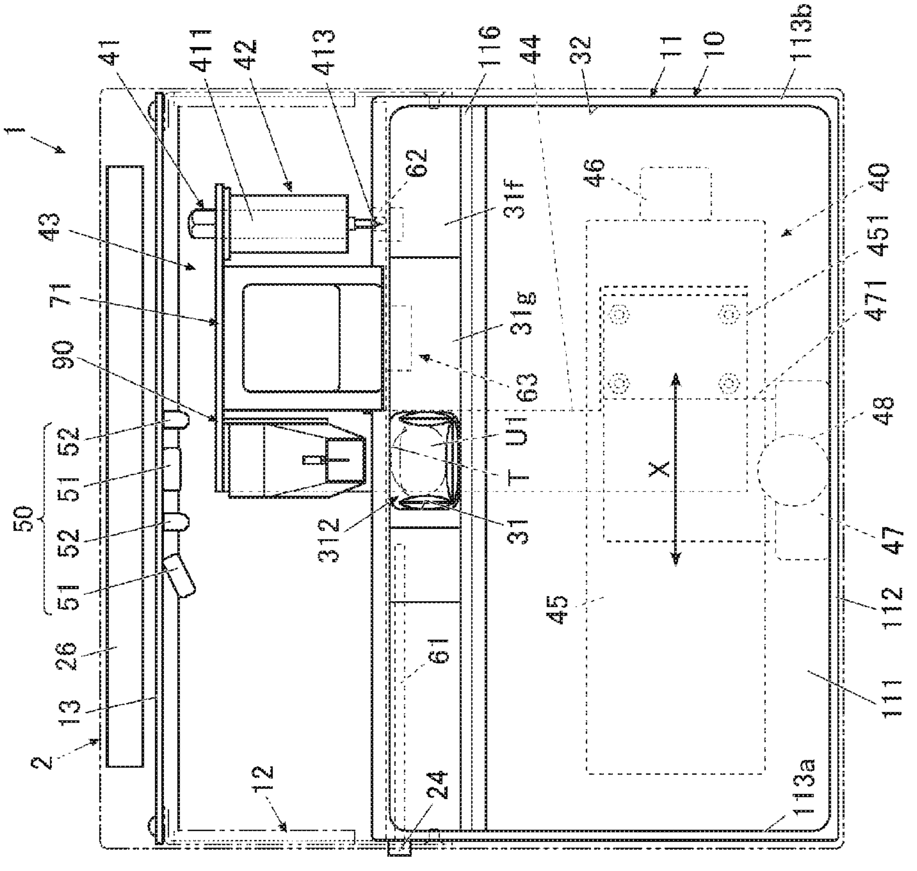
FIG. 1A is a front view of a drawing apparatus according to a first embodiment of the present invention.

FIG. 1A is a front view illustrating an internal configuration of a nail printing apparatus. FIG. 1B is a side view illustrating the internal configuration of the nail printing apparatus illustrated in FIG. 1A.

As illustrated in FIGS. 1A and 1B, in the nail printing apparatus 1 of the present embodiment, a drawing head 43 is provided with drawing tools, namely a pen 41, and an ink jet head 71. The nail printing apparatus 1 of the present embodiment uses plotter printing and ink jet printing to perform a drawing on a nail T.

The nail printing apparatus 1 is provided with a case body 2 and an apparatus main body 10 housed in the case body 2.

As illustrated in FIG. 1B, a cover 23, configured to be openable and closeable, for replacing the pen 41 and the ink jet head 71 of the hereinafter described drawing unit 40 is provided on the case body 2 from an upper surface thereof to an upper portion front surface. The cover 23 is rotatable via, for example, a hinge or the like, from a closed state to an open state, as illustrated in FIG. 1B.

An operation unit 25 (see FIG. 3) is set on an upper surface (top panel) of the case body 2.

The operation unit 25 is an input unit where a user performs various types of input.

Operation buttons (not illustrated) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens displaying various commands, and the like.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113*a* and 113*b*, an X-direction movement stage housing 114, a Y-direction movement stage housing 115, and a dividing wall 116.

Bottom edges of the side plates 113*a* and 113*b* are joined respectively to left and right edges of the bottom plate 112. The side plates 113*a* and 113*b* are provided in an upright state on the bottom plate 112.

A lower portion of the back surface plate 111 is formed so as to sink forward (toward the finger insertion direction proximal side) in two stages. The bottom edge of the back surface plate 111 is joined to a front edge of the bottom plate 112, and the back surface plate 111 divides the area surrounded by the bottom plate 112 and the side plates 113*a* and 113*b* into front and back. The space formed on the back side of the sunken back surface plate 111 becomes the X-direction movement stage housing 114 and the Y-direction movement stage housing 115 (see FIG. 1B). An X-direction movement stage 45 of the drawing unit 40 is housed in the X-direction movement stage housing 114 when the drawing unit 40 is moved forward (toward the finger insertion direction proximal side). A Y-direction movement stage 47 of the drawing unit 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113*a* and 113*b*). The dividing wall 116 is provided roughly horizontally, left and right edges of the dividing wall 116 are joined respectively to the side plates 113*a* and 113*b*, and a back edge of the dividing wall 116 is joined to the back surface plate 111.

A finger holding portion 30 (see FIG. 1B) is provided integrally in the lower frame 11.

The finger holding portion 30 is configured from an object receiver 31 for receiving the finger corresponding to the nail T (i.e. the drawing object) on which drawing will be performed (hereinafter referred to as "print finger U1"), and a finger clearing portion 32 for clearing fingers other than the print finger U1 (hereinafter referred to as "non-print fingers U2").

The object receiver 31 is disposed on an upper side of the dividing wall 116 and, for example, at roughly the center in a width direction of the lower frame 11. The space on the lower side of the lower frame 11, partitioned by the dividing wall 116, forms the finger clearing portion 32.

For example, in cases where performing a drawing on the nail T of a ring finger, the ring finger is inserted into the object receiver 31 as the print finger U1, and the non-print fingers U2, namely the other four fingers (thumb, index finger, middle finger, and little finger) are inserted into the finger clearing portion 32.

A user can pinch the dividing wall 116 between the print finger U1 inserted in the object receiver 31 and the non-print fingers U2 inserted in the finger clearing portion 32. Thus, the print finger U1 inserted in the object receiver 31 is stably held.

Figure 2A:
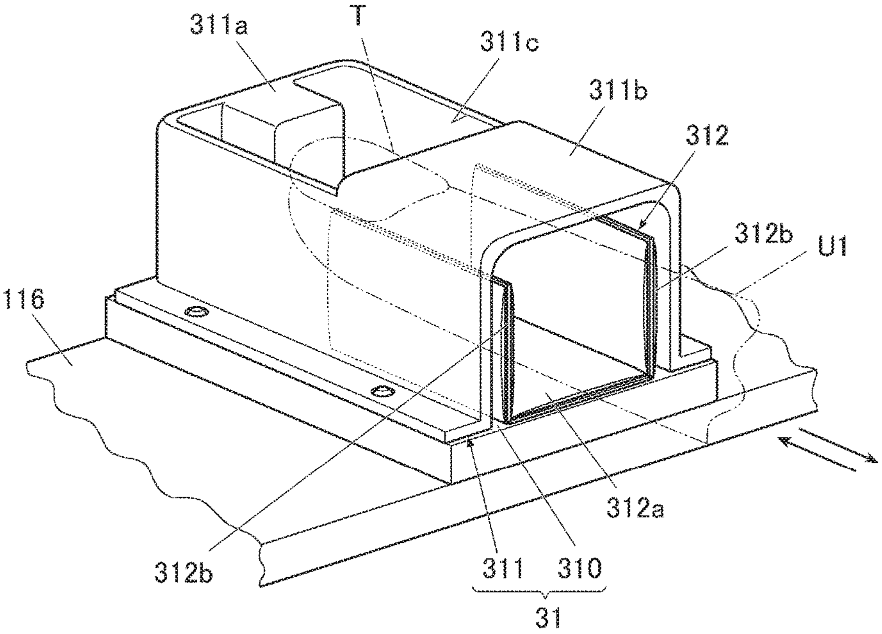
FIG. 2A is a perspective view of an object receiver, illustrating a state where holding of a print finger is released.
Figure 2B:
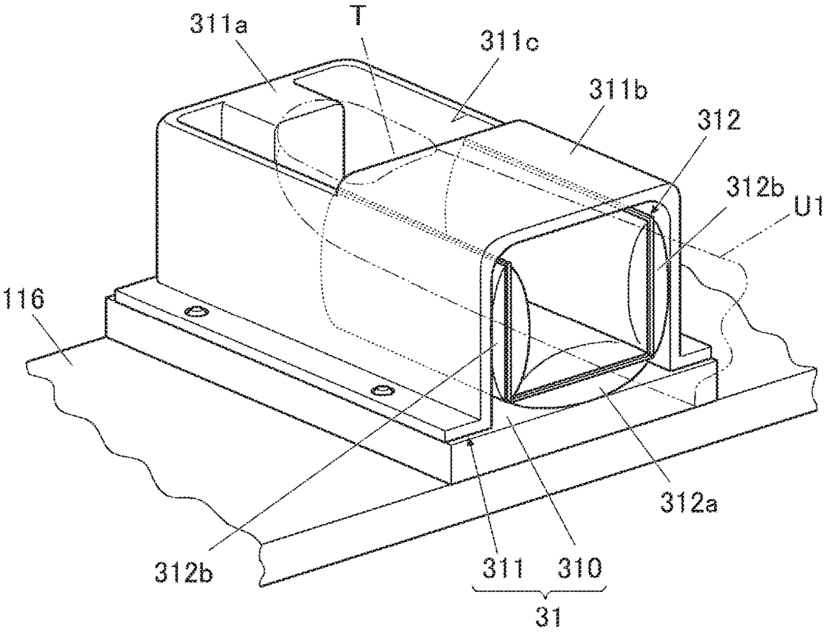
FIG. 2B is a perspective view of the object receiver, illustrating a state where the print finger is held.

FIGS. 2A and 2B are main constituent perspective views of the object receiver 31 of the present embodiment. In FIGS. 2A and 2B, the print finger U1 inserted into the object receiver is indicated by the dot-dot-dash line.

As illustrated in FIGS. 2A and 2B, an object receiver 31 includes a finger mount portion 310 constituted by a portion of the dividing wall 116. The finger mount portion 310 is where a finger of the nail T (print finger U1) on which the drawing is to be applied is mounted on the X-Y plane. The object receiver 31 also includes a finger holding case 311 fixed to the top of the finger mount portion 310 by screws or the like.

The finger holding case 311 is a substantially box-shaped member. In the finger holding case 311, a side attached to the dividing wall 116, namely a bottom side, and a side disposed on an apparatus front face side (proximal side in the print finger insertion direction) are open.

A nail stand 311*a* is provided on a back side of the finger holding case 311. The tip of the nail T of the print finger U1 is mounted on the nail stand 311*a* and, as a result, a height position of the nail T at a time of drawing is defined. Note that the nail stand 311*a* may be integrally provided with the finger holding case 311 or, for example, may be a member formed from rubber or any type of synthetic resin or the like as a separate member that is fixed to the back side of the finger holding case 311 using an adhesive or the like.

Additionally, the top surface of the finger holding case 311 on the proximal side in the print finger insertion direction is configured to be a finger holding portion 311*b* that prevents the height of the print finger U1 from rising too high; the top surface of the finger holding case 311 on the distal side in the print finger insertion direction is configured to be a window 311*c* for exposing the nail T of the print finger U1 inserted into the object receiver 31.

In the present embodiment, a state in which the tip portion of the nail T is mounted on the nail stand 311*a* and the top side of the print finger U1 is in a position (height position) contacting the bottom surface of the finger holding portion 311*b* is a drawable position at which drawing on the nail T by the pen 41 and the ink jet head 71 of the drawing unit 40 (described later) can be satisfactorily performed.

The finger holding portion 311*b* may be a simple plate-like member, or may be a cushioning material that is formed from resin or the like and provided at a portion (that is, a face on the inner side of the finger holding case 311) against which the top side of the print finger U1 abuts. Providing this cushioning material on the face of the inner side of the finger holding portion 311*b* is preferable because impact and pain will not be felt as easily when the print finger U1 is pressed up and strikes the finger holding portion 311*b*.

Additionally, an object holder 312 that holds the print finger U1 is disposed within the object receiver 31 of the present embodiment. The object holder 312 of the present embodiment is configured to be expandable and contractable by changing the internal pressure thereof and holds the print finger U1 when in an expanded state.

The object holder 312 is a bag-like member formed from a material that has a certain degree of elasticity and pliability such as, for example, a sheet of urethane resin or the like.

Note that the material of the object holder 312 is not particularly limited and any material can be used, provided that the print finger U1 is pressed up to a position where the top side of the print finger U1 contacts the bottom surface of the finger holding portion 311*b* as illustrated in FIG. 2B when the object holder 312 is in the expanded state, which is attained by injecting a fluid such as air or the like so as to raise the internal pressure; and the material can contract to a size that does not inhibit the insertion or removal of the print finger U1 as illustrated in FIG. 2A when the object holder 312 is in the contracted state, which is attained by discharging the fluid such as air or the like so as to lower the internal pressure.

In the present embodiment, the object holder 312 is formed from a center block 312*a* disposed on the bottom surface of the object receiver 31 (that is, the top side of the finger mount portion 310) and a pair of side blocks 312*b* disposed on either side of the object receiver 31. These three blocks are linked in a state whereby the inflow and outflow of the fluid is possible (that is, at least a portion of the blocks are in a state of communication).

As described above, the object holder 312 of the present embodiment is disposed on the bottom surface and both side surfaces of the object receiver 31. Thus, the object holder 312 holds the print finger U1 from three directions when the object holder 312 is placed in the expanded state by injecting the fluid.

Note that the shape, size, disposal range, and the like of the object holder 312 are not limited to the examples illustrated in the drawings.

For example, in the present embodiment, as illustrated in FIGS. 2A and 2B, the object holder 312 is only provided up to roughly the cuticle of the nail T and is not provided up to the tip portion of the finger. However, the object holder 312 may be provided farther toward the back side. However, in cases where the object holder 312 is provided up to the tip portion of the finger such as the lower portion of the nail T or the like, when the object holder 312 is expanded, the tip portion of the finger may be pressed up to a position higher than the nail stand 311*a*, and may protrude out through the window 311*c* to a position too high to perform drawing. As such, in cases where providing the object holder 312 up to the tip portion of the finger, it is preferable that a configuration be provided in which at least the object holder 312 disposed on the bottom surface of the object receiver 31 (the center block 312*a* in the present embodiment) is not provided up to the lower portion of the nail T or, if provided up to the lower portion of the nail T, the degree of expansion is adjusted so as to prevent the tip portion of the print finger U1 from being lifted excessively upward by the object holder 312.

A pump 313 (see FIG. 3) that injects the fluid (that is, for example, a gas such as air or a liquid such as water; in the present embodiment, an example is described below of a case in which the fluid is air) into the interior of the object holder 312 via a communicating tube (not illustrated) is connected to the object holder 312.

Additionally, a valve 314 (see FIG. 3) for adjusting the inflow and outflow of the fluid, and a sensor 315 (see FIG. 3) capable of detecting the internal pressure of the object holder 312 are provided between the object holder 312 and the pump 313.

In the present embodiment, as described later, the size of the print finger U1 inserted into the object receiver 31 is detected by a finger size detection portion 813 (see FIG. 3); and a pressure adjusting portion 814 (see FIG. 3) functioning as a finger holding adjusting portion adjusts the internal pressure of the object holder 312 at the time of holding the print finger U1. The pump 313, the valve 314, and the sensor 315 are connected to the pressure adjusting portion 814, which controls the operations thereof.

A front wall 31*f* (see FIG. 1A) that closes the front surface side of the lower frame 11 is provided on the top surface of the dividing wall 116, at both end portions on the front surface side of the lower frame 11. A pair of guide walls 31*g* (see FIG. 1A) that guides the print finger U1 into the object receiver 31 is erected on the top surface of the dividing wall 116, and the pair of guide walls 31*g* narrows from the end of the front wall 31*f* on the center portion side toward the object receiver 31.

A test drawing part 61 is provided on the top surface of the lower frame 11, to the side of the object receiver 31 (a position corresponding to the media access port 24 in the case body 2; the left side in FIG. 1A in the present embodiment), within a drawable range by the drawing head 43 (described later). The test drawing part 61 performs test drawing for eliminating fading and the like at a time of beginning drawing by a pen tip 413 (described later) of the pen 41.

The test drawing part 61 is a flat portion, and is configured such that drawing media (not illustrated) inserted through the media access port 24 in the case body 2 is mounted thereon.

The drawing media mounted on the test drawing part 61 is not limited, provided that test drawing of the pen tip (tip portion) 413 can be performed and, for example, may be a piece of paper.

A number of pen caps 62 (in the present embodiment, one) exactly corresponding to the number of pen holders 42 (described later) are set in a movable range of the drawing head 43 (described later), on the top surface of the lower frame 11 on a side of the object receiver 31 opposite the test drawing part 61 (the right side in FIG. 1A in the present embodiment).

The pen cap 62 is formed, for example, from rubber, and at times when the pen 41 is mounted on the drawing unit 40 but not drawing (when not drawing), drying out of the pen tip 413 is prevented by lowering the pen 41 and storing the pen tip 413 in the pen cap 62.

Additionally, an ink jet maintenance portion 63 is provided at a position corresponding to a position where the ink jet head 71 is disposed when the pen tip 413 is stored in the pen cap 62. The ink jet maintenance portion 63 is configured from, for example, a cleaning mechanism for cleaning an ink discharging portion (nozzle surface) of the ink jet head 71 (described later), a cap mechanism for holding moist conditions of the ink discharging portion (nozzle surface), and the like (all not illustrated).

Note that the disposal of the pen cap 62, the ink jet maintenance portion 63, and the like is not limited to the examples described herein.

The drawing unit 40 is configured from and provided with the drawing head 43, a unit supporting member 44 that supports the drawing head 43, the X-direction movement stage 45 for moving the drawing head 43 in the X direction (the X direction in FIG. 1A; the left-right direction of the drawing apparatus 1), an X-direction movement motor 46, the Y-direction movement stage 47 for moving the drawing head 43 in the Y direction (the Y direction in FIG. 1B; the front-back direction of the drawing apparatus 1), a Y-direction movement motor 48, and the like.

As illustrated in FIGS. 1A and 1B, in the drawing head 43 of the present embodiment, the pen holder 42 holding the pen 41 and an ink jet holder 72 holding the ink jet head 71 are disposed adjacently to each other.

The ink jet head 71 is, for example, an ink cartridge-integrated head in which ink cartridges (not illustrated) corresponding to yellow (Y), magenta (M), and cyan (C) ink are formed integrally with an ink discharging portion (not illustrated) provided on a surface (in the present embodiment, the bottom surface in FIG. 1A and the like) facing the drawing object (the nail T) in each of the ink cartridges. The ink discharging portion is provided with a nozzle array consisting of a plurality of nozzles for spraying each color of ink. The ink jet head 71 micronizes the ink and performs the drawing by spraying the ink from the ink discharging portion directly on the target drawing surface of the drawing object (the nail T). Note that the ink jet head 71 is not limited to those that discharge the three colors of ink described previously. Ink cartridges holding other ink and ink discharging portions may also be provided.

One pen 41 is mountable in the pen holder 42 of the present embodiment.

The pen 41 is a writing utensil that has the surface of the nail T as its drawing object surface, and performs a drawing by the tip portion thereof being brought into contact with the drawing object surface, namely the surface of the nail T.

As illustrated in FIG. 1B and the like, the pen 41 is provided with the pen tip 413 on a tip end side (the lower side in FIG. 1B) of a rod-like pen shaft portion 411.

An interior of the pen shaft portion 411 is an ink storing portion for storing various types of ink.

Any type of ink can be stored in the interior of the pen shaft portion 411. Viscosity of ink, diameter of the coloring particles (particle size), and the like are not particularly limited and, for example, ink containing metallic glitter, white ink, UV-curable ink, ink for gel nails, ink for under coats, ink for top coats, nail varnish, and the like can be used.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

The pen 41 is held by simply inserting it in the pen holder 42 from above. As such, the pen 41 can be easily replaced by opening the cover 23 provided in the case body 2 and, for example, using hands or tweezers to grab a top end portion of the pen shaft portion 411 and lifting the pen 41 out.

Thus, a user can realize a wide range of nail designs by appropriately replacing the pen 41 set in the pen holder 42 with a pen 41 of a different color or a different type of pen tip 413, or a pen 41 using a different type of ink, depending on the nail design desired to be drawn.

A mechanism for operating the pen 41 such as a pen vertical motor 426 constituted by a stepping motor is provided in the vicinity of the pen holder 42. The pen 41 is configured to be movable in the vertical direction (the Z direction in FIG. 1B) by the driving of this pen vertical motor 426.

The unit supporting member 44 is fixed to the X-direction movement portion 451 that is attached to the X-direction movement stage 45. The X-direction movement portion 451 is configured to move on the X-direction movement stage 45 in the X direction along a guide (not illustrated) via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement portion 471 of the Y-direction movement stage 47. The Y-direction movement portion 471 is configured to move on the Y-direction movement stage 47 in the Y direction along a guide (not illustrated) via the driving of the Y-direction movement motor 48. Thus, the drawing head 43 that is attached to the unit supporting member 44 is configured to move in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated).

In the present embodiment, a head movement portion 49 is configured as an XY drive unit that drives the drawing head 43 provided with the pen 41 in the X direction and the Y direction via the X-direction movement motor 46, the Y-direction movement motor 48, and the like.

The pen vertical motor 426, the ink jet head 71, the X-direction movement motor 46, and the Y-direction movement motor 48 of the drawing unit 40 are connected to a drawing control portion 816 of a control device 80 (see FIG. 3; described later), and are configured to be controlled by the drawing control portion 816.

Additionally, a dryer 90 is disposed beside the drawing head 43.

In the present embodiment, the dryer 90 is configured to be movable with the drawing head 43 by the head movement portion 49.

The dryer 90 includes a heater 91 (see FIG. 3) for generating heat and a fan 92 (see FIG. 3) for blowing. The dryer 90 has functions that direct the wind generated by the fan 92 to the nail T of the print finger U1 placed in the object receiver 31, and dry an ink jet drawing performed by the ink jet head 71 or a plotter drawing performed by the pen 41 on the nail T.

Note that it is preferable that the dryer 90 has a configuration in which the heater 91 can be switched ON and OFF depending on the application, and the fan 92 can be rotated while the heater 91 is OFF.

Additionally, as illustrated in FIGS. 1A and 1B, an imaging unit 50 is provided on a base plate 13 fixed to the upper frame 12. The imaging unit 50 is provided with a camera 51 and an illumination device 52.

Specifically, the base plate 13 is set on the upper frame 12, and two cameras 51 are set on a bottom surface of the base plate 13 at a position substantially above the object receiver 31.

It is preferable that the camera 51 has, for example, no less than about 2 million pixels.

The imaging unit 50 illuminates the nail T of the print finger U1, which is inserted into the object receiver 31 and is visible through the opening in the upper portion (that is, the window 311*c*), using the illumination device 52. Moreover, the print finger U1 is imaged using the cameras 51 and, captured images of the nail T of the print finger U1, namely nail images (images of the finger including nail images) are acquired.

One of the two cameras 51 is provided facing the bottom surface of the object receiver 31, and images the nail T from directly above.

Additionally, the other of the two cameras 51 is provided slightly inclined with respect to the bottom surface of the object receiver 31, and images the nail T from diagonally above.

Thus, the two cameras 51 are disposed at different positions/angles and, as a result, can image the nail T from at least two different positions/angles.

In the present embodiment, at least two nail images captured from different positions/angles are acquired by the two cameras 51 provided at different positions/angles.

Moreover, a nail shape detection portion 812 (described later) detects nail information such as a position of the nail T on the X-Y plane, an outline of the nail T (shape of the nail T), a curvature of the nail T (that is, the curved shape of the nail T), a vertical position of the nail T, and the like, on the basis of these captured images (nail images) acquired by the cameras 51. Note that, particularly, it is possible to accurately detect the curved shape of the nail T of the print finger U1 due to the fact that a plurality of the captured images (nail images) are acquired by imaging the nail T from different positions/angles.

Additionally, a finger size detection portion 813 (described later) detects a size (in the present embodiment, a width of the print finger U1 as described later) of the print finger U1 inserted into the object receiver 31, on the basis of these captured images (nail and finger images) that are acquired by at least one of the cameras 51.

The illumination device 52 is, for example, a white light emitting diode (LED) or similar light source.

In the present embodiment, the illumination device 52 is disposed on the base plate 13 in the vicinity of the cameras 51, and illuminates the nail T of the print finger U1 when imaging using the cameras 51.

Note that the specific disposal and number of the illumination devices 52 provided, and the like are not limited to the examples illustrated in the drawings.

The imaging unit 50 is connected to an imaging control portion 811 of the control device 80 (described later, see FIG. 3), and is configured to be controlled by the imaging control portion 811.

Image data of the images captured by the imaging unit 50 are stored in a nail image memory region 821 (see FIG. 3) of a memory unit 82 (described later).

The control device 80 is, for example, arranged on a base plate 13 or the like disposed in the upper frame 12.

Figure 3:
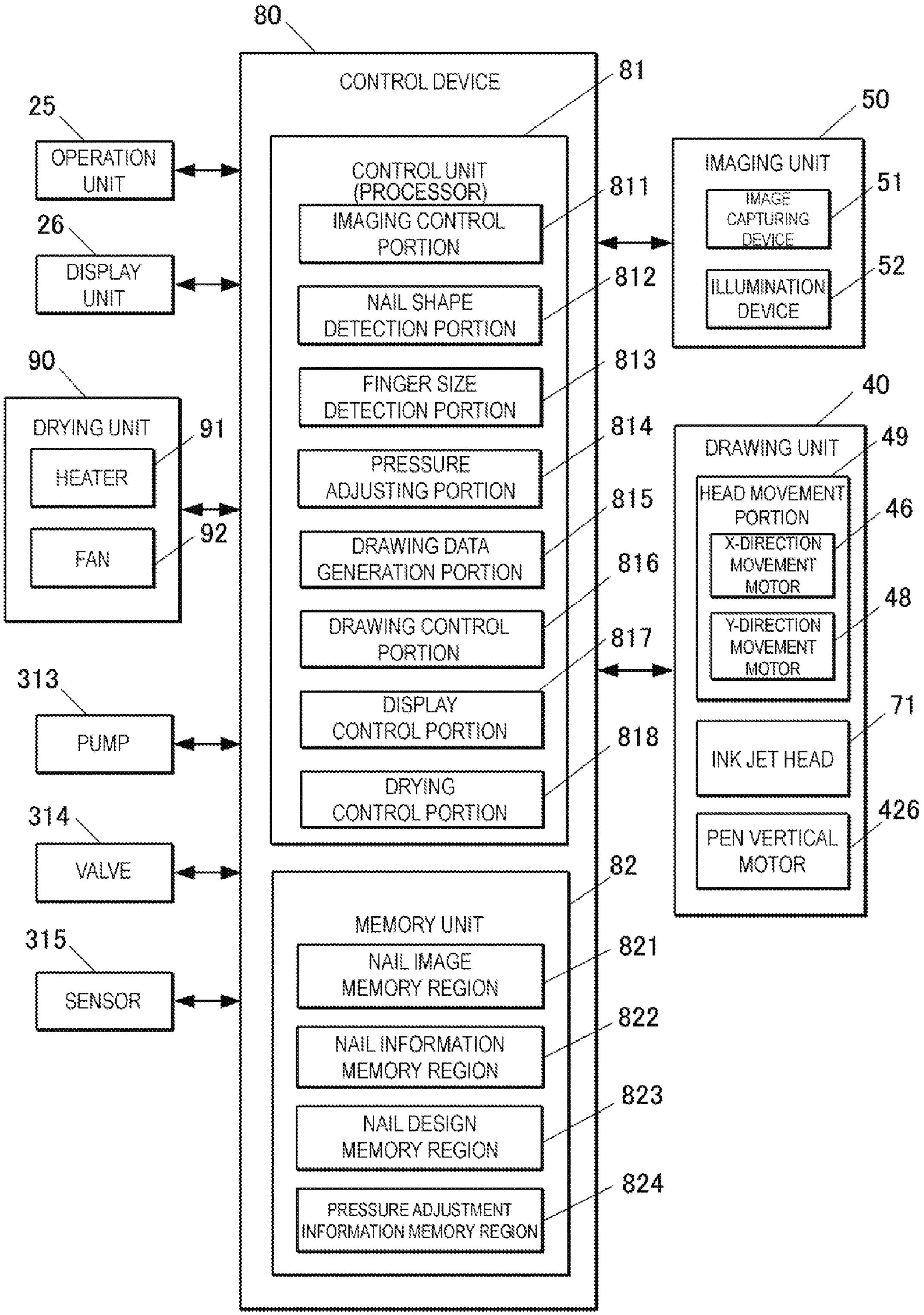
FIG. 3 is a main constituent block diagram illustrating a control configuration of the drawing apparatus according to the first embodiment of the present invention.

FIG. 3 is a main constituent block diagram illustrating the control configuration according to the present embodiment.

As illustrated in FIG. 3, the control device 80 is a computer provided with a control unit 81 constituted by a central processing unit (CPU) (not illustrated), and a memory unit 82 constituted by a read only memory (ROM), a random access memory (RAM), or the like (neither illustrated).

Various programs to operate the nail printing apparatus 1, various data, and the like are stored in the memory unit 82.

Specifically, various programs are stored in the ROM of the memory unit 82 such as a nail information detection program for detecting the shape (outline), the curved shape in the width direction, the width and length of the nail, and other nail information of the nail T from the nail images (captured images); a finger size detection program for detecting the size of the print finger U1 from the nail images (captured images); a pressure adjusting program for adjusting the internal pressure of the object holder 312; a drawing data generation program for generating drawing data; a drawing program for performing drawing processing; and the like. These programs are executed by the control device 80 and, thus, the components of the nail printing apparatus 1 are subjected to integrated control.

Additionally, in the present embodiment, the memory unit 82 is provided with the nail image memory region 821 where the nail images (captured images) of the nail T of the print finger U1 of a user acquired by the imaging unit 50 are stored; a nail information memory region 822 where the nail information detected by the nail shape detection portion 812 (the shape/outline of the nail T, the curvature of the nail T, and the like) is stored; a nail design memory region 823 where image data of a nail design to be drawn on the nail T is stored; a pressure adjustment information memory region 824 needed for the pressure adjustment processing of the object holder 312; and the like.

FIG. 4 is a drawing showing an example of a table that defines correspondence between finger width sizes and finger width levels stored in the pressure adjustment information memory region 824.

In the present embodiment, as shown in FIG. 4, an example is given in which finger width levels are classified as three sizes depending on finger width sizes. Specifically, when a lateral width (finger width W) of the print finger U1 is less than 12 mm, the finger width level is classified as "size 1"; when the finger width W is not less than 12 mm and not greater than 16 mm, the finger width level is classified as "size 2"; and when the finger width W is greater than 16 mm, the finger width level is classified as "size 3" by the finger size detection portion 813 (described later). Thus, finger width levels are associated with each finger width W.

Note that the classification of the finger width levels is not limited to the example described herein and more detailed classification is possible.

Additionally, the thresholds for each level are not limited to the example described herein and can be adjusted as deemed appropriate.

Additionally, FIG. 5 is a drawing showing an example of a table that defines correspondence between finger width levels and pressure levels stored in the pressure adjustment information memory region 824. As illustrated in FIG. 5, in the present embodiment, pressure levels (specifically, pressure values; unit: mmHg) are set whereby the internal pressure of the object holder 312 increases as the finger width decreases, in accordance with the three finger width levels defined in FIG. 4.

Specifically, a pressure level where the internal pressure of the object holder 312 is 200 mmHg is set and the print finger U1 is held for a print finger U1 having the smallest finger width level classification, namely "size 1". Additionally, a pressure level where the internal pressure of the object holder 312 is 150 mmHg is set and the print finger U1 is held for a print finger U1 with a finger width level classification of "size 2"; and a pressure level where the internal pressure of the object holder 312 is 100 mmHg is set and the print finger U1 is held for a print finger U1 with the largest finger width level classification, namely "size 3".

Note that the pressure levels corresponding to each of the finger width levels are not limited to the examples described herein and can be adjusted as deemed appropriate.

When viewed from a function perspective, the control unit 81 is provided with the imaging control portion 811, the nail shape detection portion 812, the finger size detection portion 813, the pressure adjusting portion 814, a drawing data generation portion 815, the drawing control portion 816, a display control portion 817, a drying control portion 818, and the like. Functions of the imaging control portion 811, the nail shape detection portion 812, the finger size detection portion 813, the pressure adjusting portion 814, the drawing data generation portion 815, the drawing control portion 816, the display control portion 817, the drying control portion 818, and the like are realized by cooperation of the CPU of the control unit 81 and the programs stored in the ROM of the memory unit 82.

The imaging control portion 811 is configured to cause the cameras 51 to capture finger images, that is, nail images (captured images) including images of the nail T of the print finger U1 inserted into the object receiver 31, by controlling the cameras 51 and the illumination device 52 of the imaging unit 50.

In the present embodiment, the imaging control portion 811 causes the two cameras 51 to image the nail T from a plurality of positions or angles in the width direction of the nail T (e.g. directly above the nail T and diagonally above the nail T, or the like), and acquire a plurality of the nail images (captured images).

Note that the number of captured images acquired for one nail T is not particularly limited, but it is preferable that two or more captured images be acquired from different positions in the width direction of the nail T because it will be possible to perform accurate detection, including the detection of the curvature of the nail T.

The image data of the finger images acquired by the imaging unit 50 are stored in the nail image memory region 821 of the memory unit 82.

The nail shape detection portion 812 is configured to detect the nail information on the nail T of the print finger U1 on the basis of the images (captured images) of the nail T of the print finger U1 inserted into the object receiver 31, the image being imaged by the camera 51.

In the present embodiment, the nail shape detection portion 812 detects, on the basis of the captured images, for example, the shape (outline) of the nail T, the X-Y coordinates of the horizontal position of the nail T, the height of the nail T (position in the vertical direction of the nail T, hereinafter referred to as the "vertical position of the nail T" or simply the "position of the nail T"), the shape in the width direction of the nail T, that is, the inclination angle with respect to the X-Y plane of the surface of the nail T (the curvature of the nail T or the inclination angle of the nail T), and the like. Note that the detail detected by the nail shape detection portion 812 is not limited thereto.

The nail information acquired by the nail shape detection portion 812 is stored in the nail information memory region 822 of the memory unit 82.

The finger size detection portion 813 detects the size of the print finger U1 inserted into the object receiver 31 from the images (captured images) of the print finger U1 imaged by the cameras 51.

In the present embodiment, the finger size detection portion 813 detects the finger width W as the size of the print finger U1.

Additionally, the finger size detection portion 813 references the detected finger width W of the print finger U1 against the table shown in FIG. 4 and classifies the finger width W into the three finger width levels (that is, size 1 to size 3).

Figure 6:
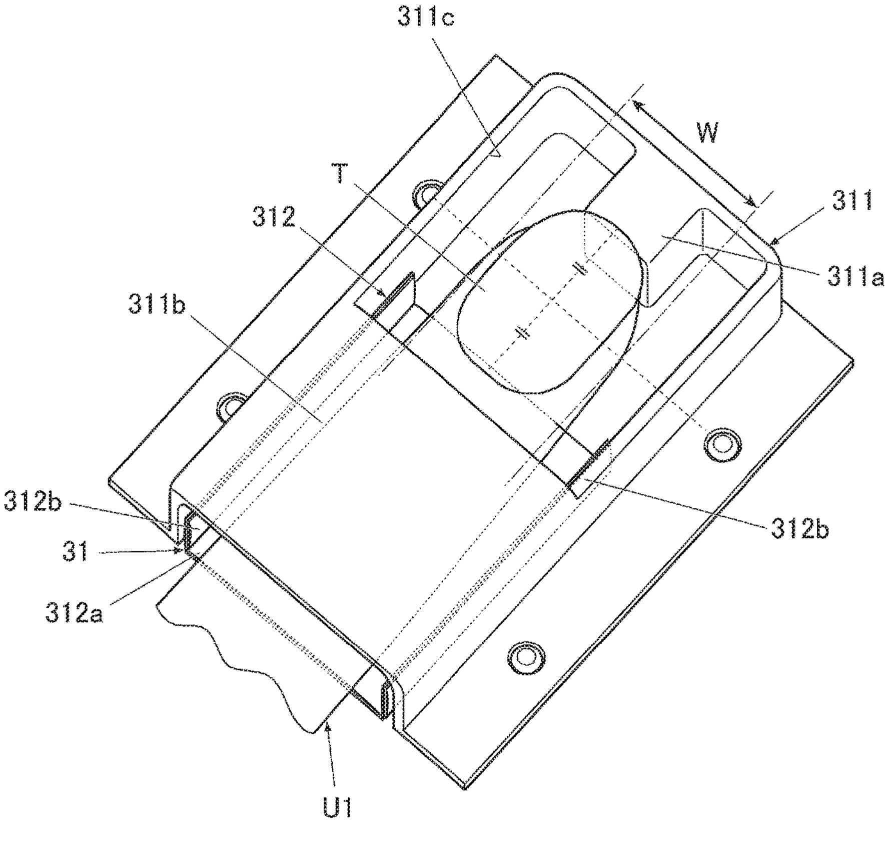
FIG. 6 is a main constituent perspective view that explains finger width detection of the print finger in the first embodiment of the present invention.

FIG. 6 is an explanatory drawing for explaining a method of finger width detection.

As illustrated in FIG. 6, in the present embodiment, an example of a case is described in which a lateral width of the print finger U1 at a center portion in a length direction of the nail T is used as the finger width W.

Note that the portion where the lateral width of the print finger U1 is taken and used as the finger width W is not limited thereto. Any portion that can be imaged by the imaging unit 50, that is, the lateral width of any portion that is exposed through the window 311*c* can be detected as the finger width W.

Note that, the settings of the finger width levels (see FIG. 4) and the set values of the pressure levels (see FIG. 5) are appropriately changed depending on which portion of the finger is used as the finger width W. For example, in cases where the lateral width of the finger width W is detected at the first joint (the DIP joint) as the size of the print finger U1, the values of the thresholds for classifying the lateral width of the print finger U1 into the finger width levels (that is, size 1 to size 3) may be generally larger compared to the values (specifically, the values shown in FIG. 4) in cases where the lateral width of the print finger U1 at the center portion in the length direction of the nail T is used as the finger width W.

The pressure adjusting portion 814 is a finger holding adjusting portion that adjusts the holding level by the object holder 312 at the time of holding the print finger U1, in accordance with the size of the print finger U1 detected by the finger size detection portion 813.

In the present embodiment, the pressure adjusting portion 814 adjusts the internal pressure of the object holder 312 at the time of holding the print finger U1, in accordance with the size of the print finger U1 detected by the finger size detection portion 813.

Specifically, the pressure adjusting portion 814 reads the pressure level (that is, the pressure value) corresponding to the finger width level (that is, size 1 to size 3), which was classified by the finger size detection portion 813, by referencing the table shown in FIG. 5, and sets this pressure level as the internal pressure value of the object holder 312 for holding the print finger U1.

Then, the pressure adjusting portion 814 controls the pump 313 and the valve 314 and places the object holder 312 in an expanded state by appropriately injecting a fluid, namely air, into the object holder 312 until the set internal pressure is reached.

Detection results are appropriately sent from the sensor 315, which detects the internal pressure of the object holder 312, to the pressure adjusting portion 814; and when the pressure adjusting portion 814 determines from these detection results that the internal pressure value of the object holder 312 has reached the set level, the pressure adjusting portion 814 halts the injection of the air by the pump 313.

For example, if the finger width size of the print finger U1 is classified as "size 1", the pressure adjusting portion 814 causes the pump 313 to operate and inject air until the internal pressure of the object holder 312 reaches 200 mmHg. When the sensor 315 detects that the internal pressure of the object holder 312 has reached 200 mmHg, the pressure adjusting portion 814 halts the air injection operation by the pump 313.

Additionally, when the drawing operation on the print finger U1 by the pen 41 or the ink jet head 71 is complete, the valve 314 is opened, the air within the object holder 312 is discharged, and the internal pressure of the object holder 312 is lowered. Thus, the object holder 312 is placed in a contracted state.

The drawing data generation portion 815 generates drawing data for the drawing to be performed by the drawing head 43 to the nail T of the print finger U1 on the basis of the nail information detected by the nail shape detection portion 812.

Specifically, on the basis of the shape of the nail T (contour shape) and the like detected by the nail shape detection portion 812, the drawing data generation portion 815 performs calibration processing, such as enlarging, reducing, and cropping, for calibrating the image data of the nail design to the shape of the nail T.

Additionally, the drawing data generation portion 815 functions as an image data correction portion that performs appropriate curvature correction on the image data of the nail design specified to be drawn on the nail T, in accordance with the curvature of the nail T detected by the nail shape detection portion 812.

As a result, drawing data for the nail design to be drawn by the pen 41 or the ink jet head 71 is generated.

The drawing control portion 816 is a control portion that outputs control signals to the drawing unit 40 on the basis of the drawing data generated by the drawing data generation portion 815, and controls the X-direction movement motor 46, the Y-direction movement motor 48, the pen vertical motor 426, the ink jet head 71, and the like of the drawing unit 40, so as to perform a drawing on the nail T that corresponds with the drawing data.

Specifically, the drawing control portion 816 controls the operations of the pen vertical motor 426 such that, when the pen 41 is not drawing, a state is held in which the tip portion (the pen tip 413) of the pen 41 is raised to a height at which the pen tip 413 is not in contact with the surface of the nail T; and when drawing, the tip portion (the pen tip 413) of the pen 41 is lowered to a height at which the pen tip 413 contacts the surface of the nail T.

Additionally, the drawing control portion 816 sequentially applies drawing at predetermined positions on the nail T while causing the drawing head 43 to move appropriately in the X-direction and the Y-direction by appropriately causing the X-direction movement motor 46 and the Y-direction movement motor 48 to operate.

The display control portion 817 is configured to control the display unit 26 to cause the display unit 26 to display various display screens. In the present embodiment, examples of the various types of display screens the display control portion 817 is configured to display on the display unit 26 include nail design selection screens and thumbnail images for confirming designs, nail images acquired by imaging the print finger U1, various command screens, operation screens, and the like.

The drying control portion 818 controls the drying operation of the dryer 90 and causes drying processing to be performed on the nail T inserted into the object receiver 31 on which the drawing has been applied.

Specifically, the drying control portion 818 appropriately switches the heater 91 and the fan 92 of the dryer 90 ON and OFF. Additionally, the drying control portion 818 appropriately performs temperature control of the heater 91 and is capable of turning the heater 91 OFF and only causing the fan 92 to operate, as necessary.

Figure 7:
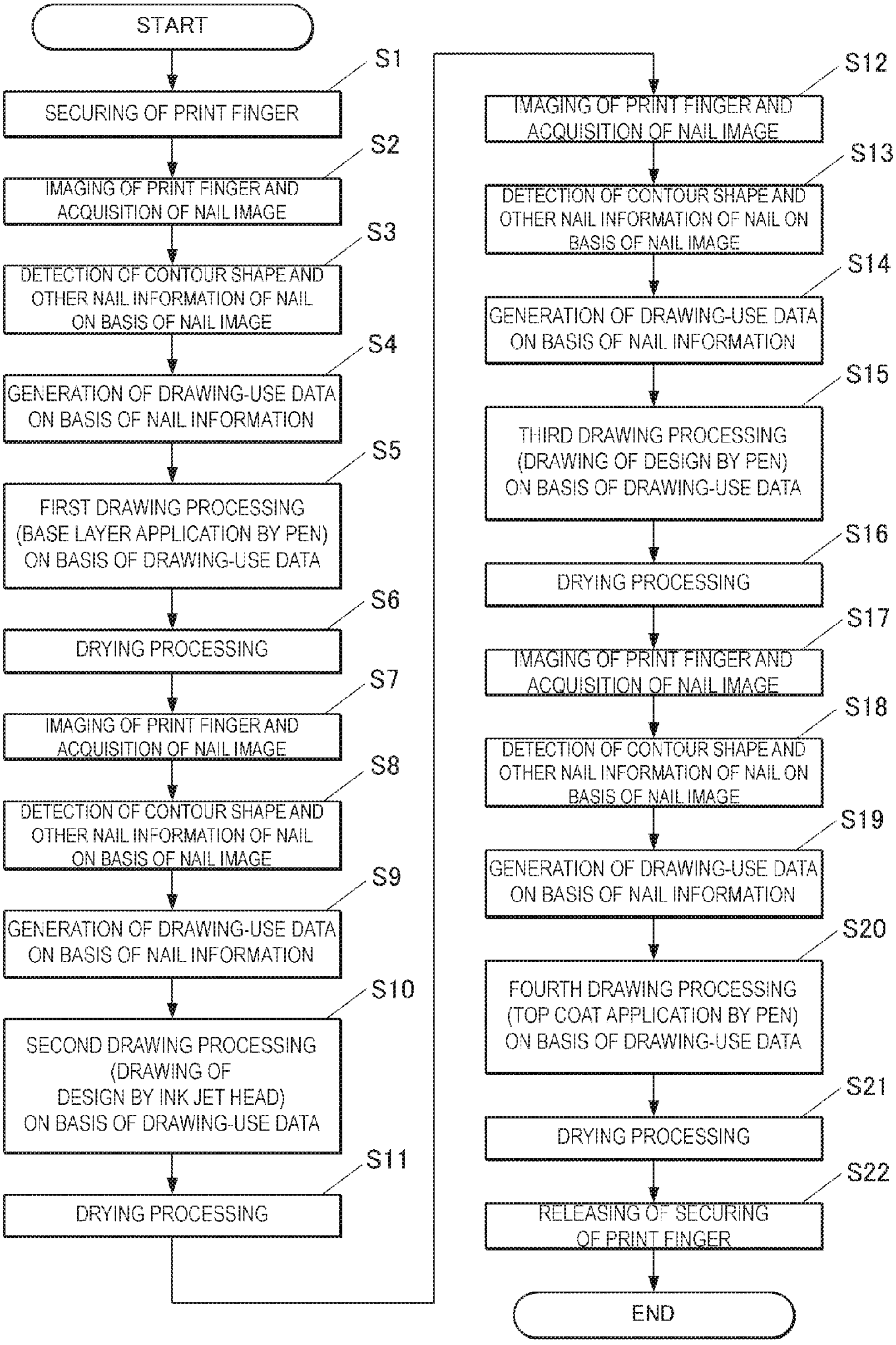
FIG. 7 is a flowchart showing drawing processing of the drawing apparatus according to the first embodiment of the present invention.
Figure 8:
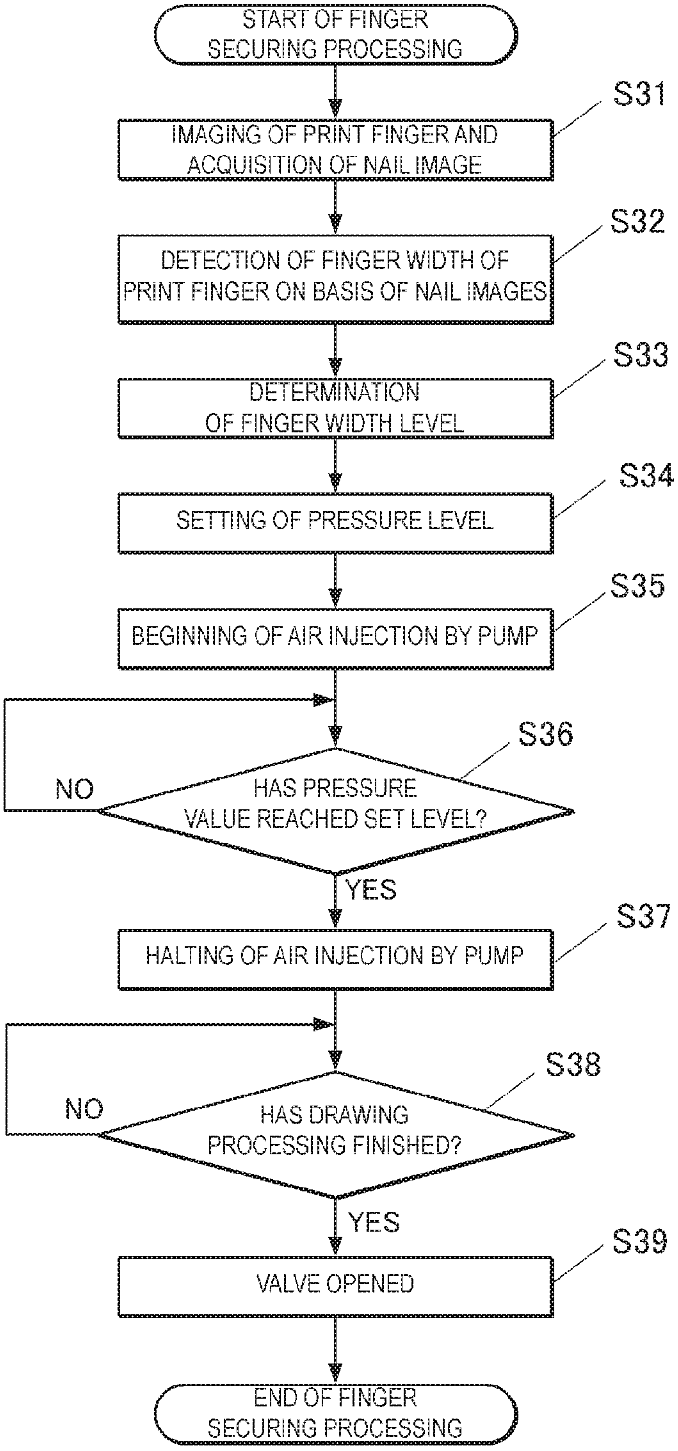
FIG. 8 is a flowchart showing finger holding processing according to the first embodiment of the present invention.

Next, a finger holding method and a drawing method by the nail printing apparatus (drawing apparatus) 1 according to the present embodiment is described while referencing FIGS. 7 and 8.

First, the overall flow of the drawing processing by the nail printing apparatus (drawing apparatus) 1 will be described while referencing FIG. 7. Note that here, an example of a case is described in which a four-stage drawing processing is sequentially performed. Specifically, a first drawing processing for applying a base layer to the nail T using the pen 41; a second drawing processing for drawing a design using the ink jet head 71; a third drawing processing for drawing a design using the pen 41; and a fourth drawing processing for applying a top coat on the nail T on which the designs and the like have been drawn using the pen 41 are performed.

Note that the details of the drawing processing are not limited to the example described herein and may include other processing steps as well. Moreover, only a portion of the drawing processing described above may be performed. For example, a configuration is possible in which only the first drawing processing for applying a base layer on the nail T using the pen 41 and the third drawing processing for drawing a design using the pen 41 are performed.

In cases where performing drawing using the nail printing apparatus 1, a user first operates a power switch to turn on the control device 80.

The display control portion 817 causes a design selection screen to be displayed on the display unit 26, and the user operates operation buttons or the like on the operation unit 25 and selects a desired nail design from among a plurality of nail designs displayed on the design selection screen. As a result, a selection command signal is output from the operation unit 25 and the nail design intended to be drawn on the nail T is selected.

Next, the user inserts the print finger U1 into the object receiver 31, inserts the non-print fingers U2 into the finger clearing portion 32, and operates a drawing switch (not illustrated) of the operation unit 25, thereby holding the print finger U1 within the object receiver 31 (step S1).

Upon input of a command from the drawing switch and before starting the drawing operations, first, the imaging control portion 811 controls the cameras 51 and the illumination device 52 of the imaging unit 50 and causes the camera 51 to image the print finger U1, and acquire nail images (captured images) (step S2).

Upon acquisition of the nail images (the captured images), the nail shape detection portion 812 detects the outer shape, namely the contour shape, of the nail T on the basis of the nail images (the captured images). Additionally, the nail shape detection portion 812 detects the curvature of the nail T and other nail information on the basis of the nail images (the captured images) (step S3).

Next, the drawing data generation portion 815 generates drawing-use data (drawing data for the nail design) for drawing a nail design selected by the user on the nail T of the user, on the basis of the nail information detected by the nail shape detection portion 812 (step S4).

Upon generation of the drawing-use data, the drawing control portion 816 exports the drawing-use data to the drawing unit 40 and causes the head movement portion 49 to operate and perform the first drawing processing for applying a base layer to the nail T using the pen 41 while appropriately moving the drawing head 43 (step S5).

Upon completion of the first drawing processing, the drying control portion 818 controls the operations of the dryer 90 and causes drying processing for drying the ink applied to the nail T to be performed (step S6).

When the drying processing has been performed for a predetermined period of time, the imaging control portion 811 controls the imaging unit 50 again and causes the cameras 51 to acquire nail images (captured images) (step S7); and nail information such as the contour shape of the nail T and the like is detected from the nail images (captured images) by the nail shape detection portion 812 (step S8). Then, the drawing data generation portion 815 generates drawing-use data for performing the next drawing processing (that is, the second drawing processing) on the basis of this nail information (step S9); and the second drawing processing for drawing a design using the ink jet head 71 is performed on the basis of the generated drawing-use data (step S10).

Upon completion of the second drawing processing, the drying processing is performed again (step S11). When the drying processing has been performed for a predetermined period of time, the imaging control portion 811 controls the imaging unit 50 again and causes the cameras 51 to acquire nail images (captured images) (step S12); and nail information such as the contour shape of the nail T and the like is detected from the nail images (captured images) by the nail shape detection portion 812 (step S13). Then, the drawing data generation portion 815 generates drawing-use data for performing the next drawing processing (that is, the third drawing processing) on the basis of this nail information (step S14); and the third drawing processing for drawing a design using the pen 41 is performed on the basis of the generated drawing-use data (step S15).

Upon completion of the third drawing processing, the drying processing is performed again (step S16). When the drying processing has been performed for a predetermined period of time, the imaging control portion 811 controls the imaging unit 50 again and causes the cameras 51 to acquire nail images (captured images) (step S17); and nail information such as the contour shape of the nail T and the like is detected from the nail images (captured images) by the nail shape detection portion 812 (step S18). Then, the drawing data generation portion 815 generates drawing-use data for performing the next drawing processing (that is, the fourth drawing processing) on the basis of this nail information (step S19); and the fourth drawing processing for applying a top coat, using the pen 41, on the nail T on which designs have been drawn in the first to third drawing processing is performed on the basis of the generated drawing-use data (step S20).

Upon completion of the fourth drawing processing, the drying processing is performed again (step S21). When the drying processing has been performed for a predetermined period of time, the holding of the print finger U1 is released (step S22), and the drawing processing is finished.

In cases where performing four-stage drawing processing such as that described above, 2 to 3 minutes are required for the nail T of each finger or toe. During this time, the print finger U1 must be satisfactorily held so that drawing position shifts do not occur. Moreover, to the greatest extent possible, hardship and discomfort must not be inflicted on the user.

On this point, next, holding processing of the print finger U1 according to the present embodiment will be described while referencing FIG. 8.

As illustrated in FIG. 8, in cases where performing the holding of the print finger U1 (step S1 in FIG. 7), first, the imaging control portion 811 controls the cameras 51 and the illumination device 52 of the imaging unit 50 and causes the cameras 51 to image the print finger U1, and acquire captured images (step S31).

Note that these captured images may be shared with the images (nail images) of the nail T including the finger portion acquired in step S2 in FIG. 7. In this case, it is sufficient that acquisition of the captured images be performed once between step S1 and step S2 in FIG. 7.

Then, upon acquisition of the captured images, the finger size detection portion 813 detects the finger width W as the size of the print finger U1, on the basis of the captured images (step S32).

Furthermore, the finger size detection portion 813 references a table such as that shown in FIG. 4 and classifies (determines) which of the three finger width levels applies to the detected finger width W (step S33). For example, in a case where the print finger U1 is a middle finger and the detected finger width W is 13 mm, the finger width level is classified as "size 2".

Upon classification (determination) of the finger width level, the pressure adjusting portion 814 references a table such as that shown in FIG. 5, reads the pressure value corresponding to the finger width level, and sets this pressure value as the internal pressure of the object holder 312 for holding the print finger U1 (step S34). For example, continuing with the previous example, since the finger width level was classified (determined) as "size 2", the pressure level is set to 150 mmHg.

Then, the pressure adjusting portion 814 causes the pump 313 to operate and begin injection of air into the object holder 312 (step S35) and also acquires the internal pressure value of the object holder 312 from the sensor 315. The pressure adjusting portion 814 constantly determines whether or not the pressure value has reached the set level (that is, 150 mmHg in the example given above) (step S36). In cases where it is determined that the pressure value has not reached the set level (step S36; NO), the pressure adjusting portion 814 continues to cause the pump 313 to operate and repeats the determination of step S36.

On the other hand, in cases where it is determined that the pressure value has reached the set level (step S36; YES), the pressure adjusting portion 814 halts the injection of air into the object holder 312 by the pump 313 (step S37). At this time, the object holder 312 is in a satisfactory expanded state corresponding to the size of the print finger U1, and the print finger U1 is held at a position suitable for performing drawing on the nail T.

The pressure adjusting portion 814 determines whether or not the drawing processing on the nail T of the print finger U1 (in the example given above, the first to fourth drawing processing of the four-stage drawing processing) has finished (step S38). In cases where it is determined that the drawing processing has not finished (step S38; NO), the pressure adjusting portion 814 holds the internal pressure of the object holder 312 at the predetermined pressure value (e.g. 150 mmHg in the example given above), and repeats the determination of step S38.

On the other hand, in cases where it is determined that the drawing processing has finished (step S38; YES), the pressure adjusting portion 814 causes the valve 314 to open thereby discharging the air in the object holder 312 and lowering the internal pressure of the object holder 312 to a contracted state (step S39). Thus, the processing is finished. As a result, the object holder 312 is placed in a state in which the holding is released (that is, the state of step S22 in FIG. 7) and, in this state, the user can remove the print finger U1 from the object receiver 31.

As described above, according to the present embodiment, the size of the print finger U1 is detected from the captured images of the print finger U1, and the internal pressure of the object holder 312 is adjusted at the time of holding the print finger U1, in accordance with the detected size of the print finger U1. Thus, the object holder 312 is placed in the expanded state and the print finger U1 is held.

As such, regardless of the size of the finger to which the nail T on which drawing is to be performed belongs, holding can be performed using a suitable degree of squeezing force, and the holding of the print finger U1 can be satisfactorily performed without the print finger U1 moving during drawing and the drawing position shifting, and also without squeezing too much and inflicting pain, hardship, or the like on the print finger U1.

Additionally, in the present embodiment, the object holder 312 is disposed on the bottom surface and both side surfaces of the object receiver 31, and holds the print finger U1 from three directions. As such, the print finger U1 will be enveloped and, thus, can be satisfactorily held.

Additionally, in the present embodiment, the size of the print finger U1 detected by the finger size detection portion 813 is the finger width of the print finger U1, and the internal pressure of the object holder 312 is adjusted at the time of holding the print finger U1 in accordance with this finger width. As such, the finger size can be easily detected from captured images taken from above the print finger U1.

SECOND EMBODIMENT

Next, a second embodiment of the nail printing apparatus (drawing apparatus) and drawing method for the nail printing apparatus (drawing apparatus) according to the present invention are described while referring to FIGS. 9 to 13C. Note that in the present embodiment, only the configuration of the object receiver is different than the first embodiment. As such, in the following description, the points that differ from the first embodiments will be focused on.

Figure 9:
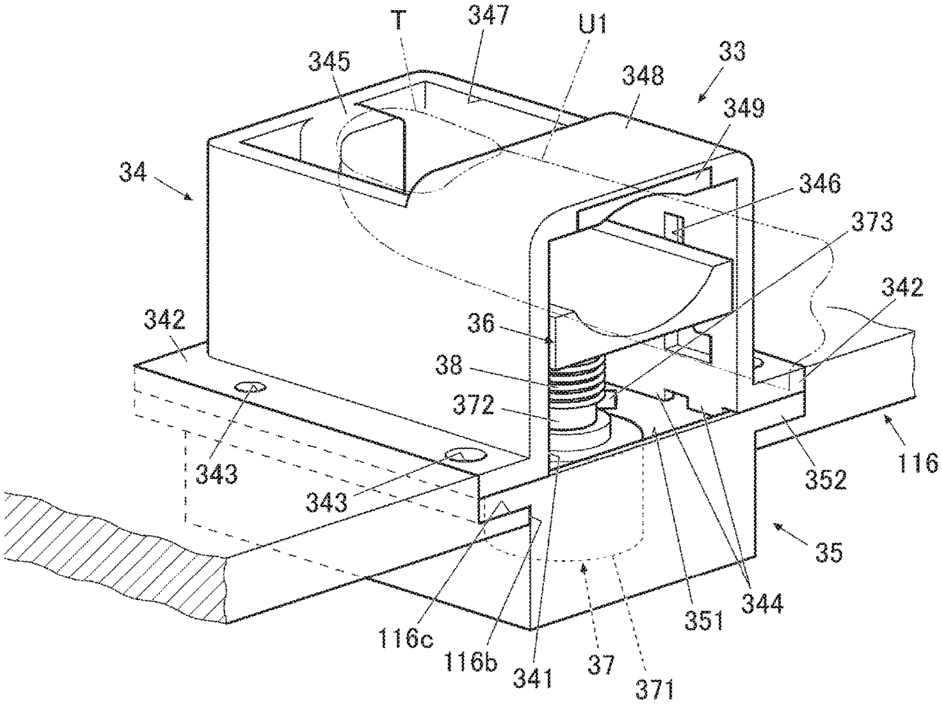
FIG. 9 is a perspective view of an object receiver in a second embodiment of the present invention.
Figure 10A:
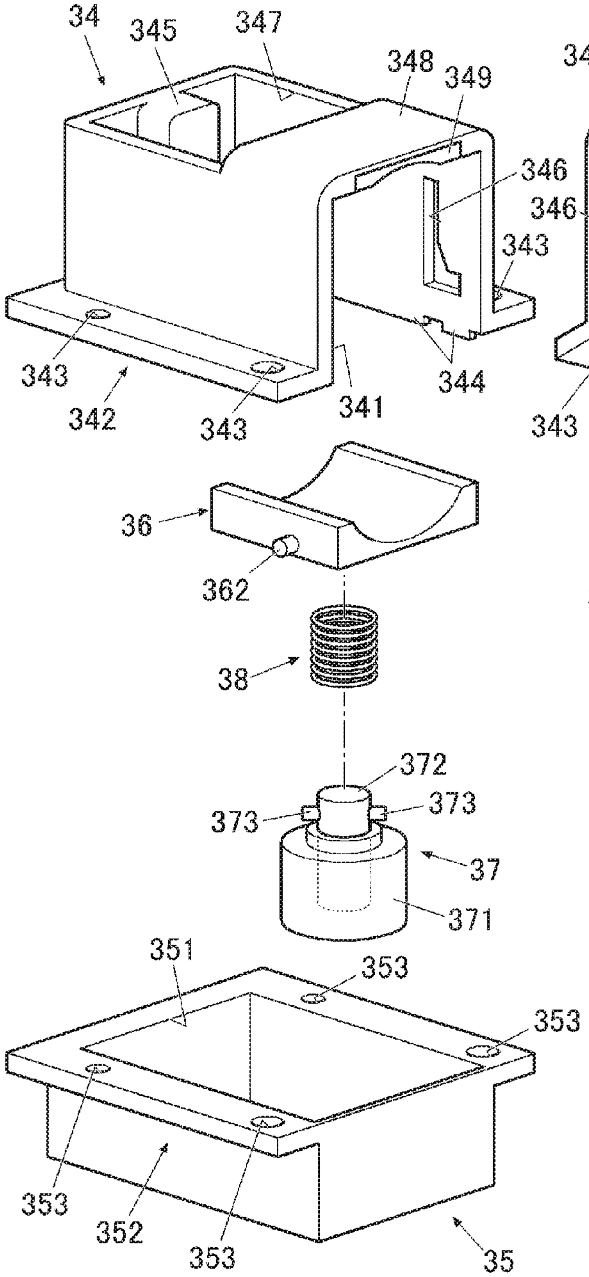
FIG. 10A is an exploded perspective view of the object receiver illustrated in FIG. 9, seen from diagonally above.
Figure 10B:
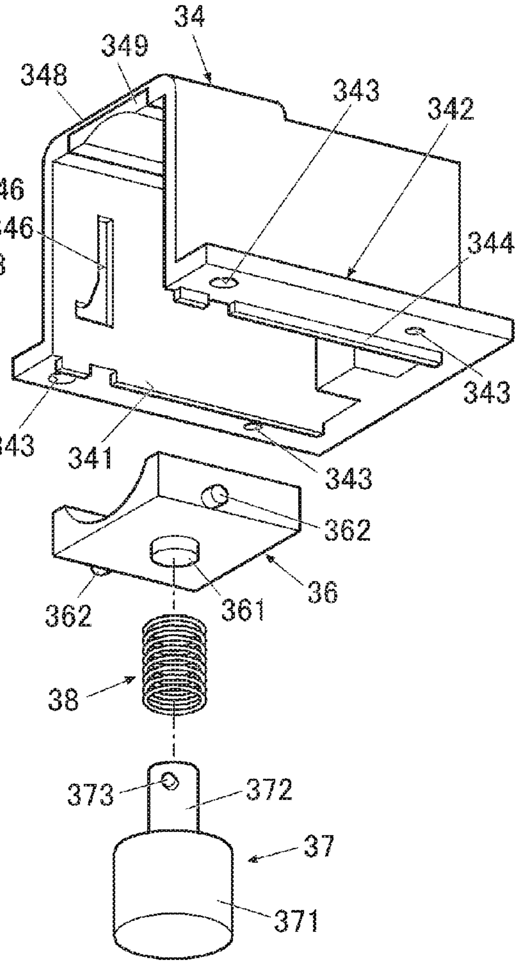
FIG. 10B is an exploded perspective view of the object receiver illustrated in FIG. 9, seen from diagonally below.

FIG. 9 is a perspective view of the object receiver of the present embodiment. FIGS. 10A and 10B are exploded perspective views of the object receiver. Note that in FIG. 10B, a lower case 35 (described hereinafter) is not illustrated.

As illustrated in FIGS. 9, 10A, and 10B, as in the first embodiment, the object receiver 33 is configured such that at least one print finger U1 corresponding to the drawing object, namely the nail T, can be inserted. The object receiver 33 includes an upper case 34 and a lower case 35, and is formed in roughly a box-shape.

A bottom surface side of the upper case 34 is an open portion 341, and an outward facing flange 342 is formed along a peripheral edge of this open portion 341. Screw holes 343 are formed in the outward facing flange 342, at two locations on both side portions of the upper case 34. Additionally, retaining portions 344 are erected in the open portion 341, facing outward.

Additionally, a top surface side of the lower case 35 is an open portion 351, and an outward facing flange 352 is formed along a peripheral edge of this open portion 351. Screw holes 353 are formed in the outward facing flange 352, at positions that correspond to the screw holes 343 in the upper case 34.

In the present embodiment, a configuration is given in which the upper case 34 is fitted on the lower case 35 in a state where the open portion 341 is the lower side; the retaining portion 344 of the upper case 34 engages with the side surface inner side of the lower case 35 when the cases are fitted together; and the outward facing flanges 342 and 352 of the upper case 34 and the lower case 35 are stacked.

In the present embodiment, a notch 116*b* is formed in the dividing wall 116 at a position corresponding to the object receiver 33, and the surroundings of this notch 116*c* are configured to be a step portion 116*c* that is lowered one step from the top surface of the dividing wall 116.

The lower case 35 is configured to be fitted into the notch 116*b* and, in the state where the upper case 34 is fitted on the lower case 35, the outward facing flanges 342 and 352 are disposed on the step portion 116*c* of the dividing wall 116, and the top surface of the outward facing flange 342 of the upper case 34 is configured to be substantially flush with the top surface of the dividing wall 116. In this fitted state, the upper case 34 and the lower case 35 are fixed to the dividing wall 116 by screwing screws (not illustrated) through the screw holes 343 and 353 in the outward facing flanges 342 and 352.

As illustrated in FIG. 9, the proximal side in the print finger insertion direction of the upper case 34, in the state where the upper case 34 and the lower case 35 are fixed to the dividing wall 116, is open.

Additionally, as in the first embodiment, a nail stand 345, on which the free end of the nail T is mounted when drawing, is provided on the distal side in the print finger insertion direction in the upper case 34.

Guide grooves 346 for guiding a finger mounting stand 36 (described later) along the vertical direction (Z direction in FIG. 9) are provided in the inner sides of both side surfaces of the upper case 34. Note that the positions where provided, shape, number and the like of the guide grooves are not limited to the examples illustrated in the drawings.

Additionally, the top surface of the upper case 34 on the distal side in the print finger insertion direction is configured to be a window 347 for exposing the nail T of the print finger U1 inserted into the object receiver 33; and the top surface of the upper case 34 on the proximal side in the print finger insertion direction is configured to be a finger holding portion 348 that prevents the height of the print finger U1 from rising too high.

In the present embodiment, a state in which the free edge of the nail T is mounted on the nail stand 345 and the top side of the print finger U1 is in a position (height position) contacting the bottom surface of the finger holding portion 348 is a drawable position at which drawing on the nail T, which is exposed through the window 347, by the pen 41 and the ink jet head 71 of the drawing unit 40 can be satisfactorily performed.

With the finger holding portion 348 of the present embodiment, a cushioning material 349 is provided that is formed from resin or the like at a portion (that is, a surface on the inner side of the top surface of the upper case 34) against which the top side of the print finger U1 abuts. Providing this cushioning material on the surface of the inner side of the finger holding portion 348 is preferable because impact and pain will not be felt as easily in cases where the print finger U1 is pressed up and strikes the finger holding portion 348.

Note that the configuration of the finger holding portion 348 is not limited to the example described herein, and may be configured as a simple plate-like member.

An object holder for holding the print finger U1 is disposed in the interior of the upper case 34 and the lower case 35 that constitute the object receiver 33.

In the present embodiment, the object holder is provided with the finger mounting stand 36 on which the print finger U1 is mounted and a lifting mechanism 37 for lifting and lowering the finger mounting stand 36.

The finger mounting stand 36 is configured to hold the print finger U1 mounted thereon as a result of the lifting mechanism 37 lifting and the print finger U1 becoming sandwiched between the finger mounting stand 36 and the finger holding portion 348.

The top surface of the finger mounting stand 36, which is the mounting surface on which the print finger U1 is mounted, is formed into a shape following the shape of a finger, a cross-section thereof being substantially arcuate. Note that the shape of the finger mounting stand 36 is not limited to the examples illustrated in the drawings, but is preferably a shape whereby the print finger U1 can be stably held.

A spring 38 is interposed between the finger mounting stand 36 and the lifting mechanism 37, and a convex spring retaining portion 361, where one end side of the spring 38 is retained, is provided on a bottom surface of the finger mounting stand 36.

Note that the member interposed between the finger mounting stand 36 and the lifting mechanism 37 is not limited to a spring, and any elastic member may be used. Additionally, it is sufficient that the retaining portion 361 be capable of retaining the spring 38 and the shape and the like are not limited to the examples illustrated in the drawings.

Additionally, guide protrusions 362 that are movable along the guide grooves 346 are provided on both side portions of the finger mounting stand 36, at positions corresponding to the guide grooves 346 provided in the upper case 34.

In the present embodiment, the lifting mechanism 37 is a push-pull solenoid, and includes a frame 371 that houses a coil or the like (not illustrated), and a plunger 372 configured to be pushed or pulled in and out of the frame 371. The lifting mechanism 37 is configured such that the plunger 372 operates in the vertical direction in FIG. 9 and the like when energized, and the operations thereof are controlled by a lift adjusting portion 819 (described later) functioning as the finger holding adjusting portion.

Note that the lifting mechanism 37 is not limited to a push-pull solenoid and any mechanism can be used that is capable of lifting and lowering the finger mounting stand 36. For example, various types of small motors, actuators, and the like may be applied.

A spring retaining portion 373 is provided on a free end side of the plunger 372, and the other end side of the spring 38 is retained on this spring retaining portion 373.

Additionally, the lifting mechanism 37 is fixed in the lower case 35 by screws or the like (not illustrated).

Figure 11:
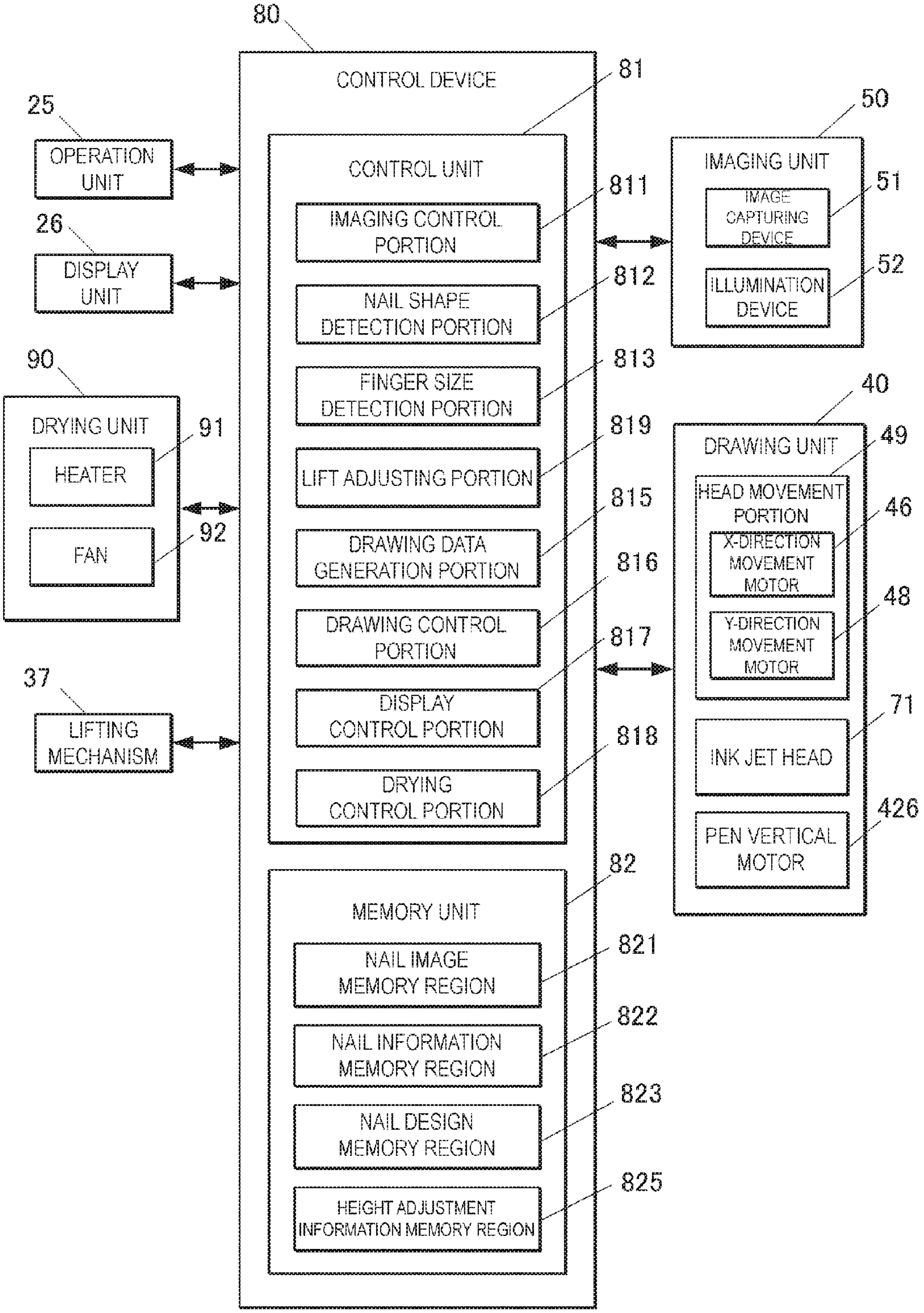
FIG. 11 is a main constituent block diagram illustrating a control configuration of the drawing apparatus according to the second embodiment of the present invention.

FIG. 11 is a main constituent block diagram illustrating a control configuration of the drawing apparatus according to the present embodiment.

As illustrated in FIG. 11, a memory unit 82 of the present embodiment is provided with a height adjustment information memory region 825 and the like necessary for lifting adjustment processing for adjusting the height level of the object holder, namely the finger mounting stand 36.

Additionally, while not illustrated in the drawings, a lifting adjustment program for adjusting the height level of the finger mounting stand 36 in accordance with the size of the print finger U1 is stored in the memory unit 82.

A table, which is the same as the table in the first embodiment that defines correspondence between finger width sizes and finger width levels stored in the pressure adjustment information memory region 824, is stored in the height adjustment information memory region 825.

Additionally, a table that defines correspondence between finger width levels and height levels is stored in the height adjustment information memory region 825.

FIG. 12 is a drawing showing an example of the table that defines correspondence between finger width levels and height levels. As illustrated in FIG. 12, in the present embodiment, height levels are set whereby the height of the finger mounting stand 36 increases as the finger width decreases, in accordance with the three finger width levels defined in the table that defines correspondence between finger width sizes and finger width levels.

Note that in the present embodiment, the height levels are defined as the distance from the top surface of the finger mounting stand 36 to the bottom surface of the finger holding portion 348.

In the present embodiment, the print finger U1 is sandwiched and held between the top surface of the finger mounting stand 36 and the bottom surface of the finger holding portion 348. As such, it is preferable that the height level of the finger mounting stand 36 be set in accordance with the width or thickness of the print finger U1.

For example, data obtained by measuring the thicknesses of fingers from near the first joint to just before the second joint includes 7 mm <finger thickness 1≤12 mm, where finger thickness 1 is the thickness of the little finger, which has the smallest finger thickness; 12 mm <finger thickness 2≤22 mm, where finger thickness 2 is the thickness of the index, middle, or ring finger, which have medium finger thicknesses; and 17 mm <finger thickness 3≤22 mm, where finger thickness 3 is the thickness of the thumb, which has the largest finger thickness.

However, measuring and detecting the length dimension in the thickness direction of the print finger U1 inserted into the object receiver 33 is not easy.

On this point, because the thickness of a finger is proportional to the width dimension of the finger, lateral width levels of fingers (also referred to as finger width levels) can be substituted for thickness levels of fingers.

As such, in the present embodiment, as in the first embodiment, a table that defines correspondence between finger width sizes and finger width levels is prepared, and the finger width level of the print finger U1 is classified as one of "size 1" to "size 3". Furthermore, the table that defines correspondence between finger width levels and height levels such as that shown in FIG. 12 is referenced, and the height level for each print finger U1 is set.

Figure 13A:
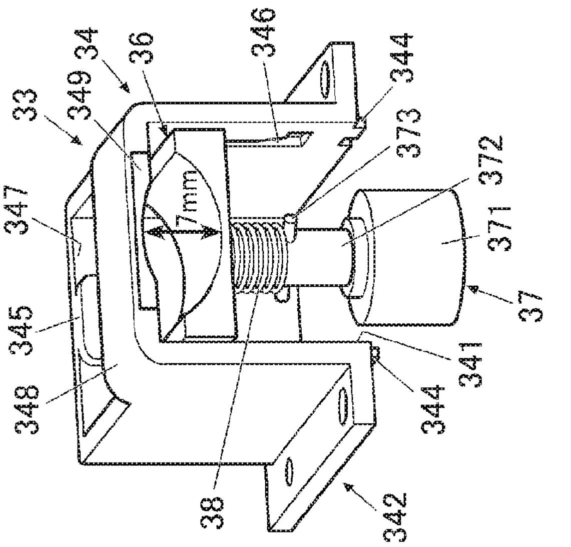
FIG. 13A is a perspective view illustrating the object receiver in a case where the finger width level of the print finger is small.
Figure 13B:
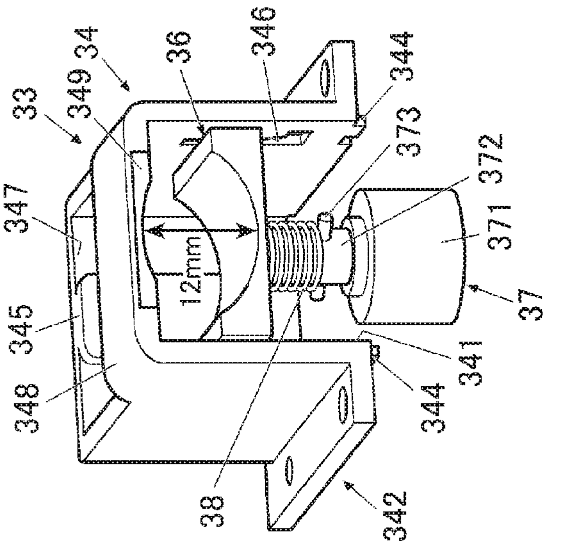
FIG. 13B is a perspective view illustrating the object receiver in a case where the finger width level of the print finger is medium.
Figure 13C:
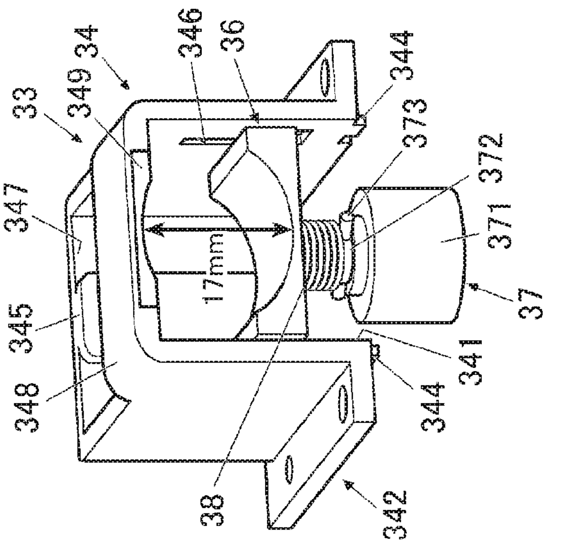
FIG. 13C is a perspective view illustrating the object receiver in a case where the finger width level of the print finger is large.

Specifically, as illustrated in FIG. 13A, a height level where the height (that is, the distance from the top surface of the finger mounting stand 36 to the bottom surface of the finger holding portion 348) of the finger mounting stand 36 is 7 mm is set and the print finger U1 is held for a print finger U1 with the smallest finger width level classification, namely "size 1". Additionally, as illustrated in FIG. 13B, a height level where the height of the finger mounting stand 36 is 12 mm is set and the print finger U1 is held for a print finger U1 with a finger width level classification of "size 2"; and, as illustrated in FIG. 13C, a height level where the height of the finger mounting stand 36 is 17 mm is set and the print finger U1 is held for a print finger U1 with the largest finger width level classification, namely "size 3".

Note that the spring 38 is interposed between the finger mounting stand 36 and the lifting mechanism 37 and, by setting the height levels as described above, the compression range of the spring 38 will be a maximum of 5 mm. Thus, even with the compression load difference, it will be possible to keep the spring to about a few gf. As a result, differences in holding force caused by differences in the thicknesses of fingers can be mostly eliminated, and print fingers U1 of various thicknesses can be satisfactorily held.

Note that the measuring method of the finger width size and the method of classifying the finger width level in accordance with the finger width size are the same as in the first embodiment. Thus, description thereof is omitted.

Additionally, the height levels corresponding to each of the finger width levels, the thresholds of each level, and the like are not limited to the examples described herein and, as in the first embodiment, can be adjusted as deemed appropriate.

Additionally, in the present embodiment, the control unit 81 functions as the lift adjusting portion 819 that controls the operations of the lifting mechanism 37.

The lift adjusting portion 819 is a finger holding adjusting portion that adjusts the height of the finger mounting stand 36 at the time of holding the print finger U1, in accordance with the size of the print finger U1 detected by the finger size detection portion 813.

Specifically, the lift adjusting portion 819 reads the height level (that is, the distance from the top surface of the finger mounting stand 36 to the bottom surface of the finger holding portion 348) corresponding to the finger width level (that is, size 1 to size 3), which was classified by the finger size detection portion 813, by referencing the table shown in FIG. 12, and sets this height level as the height of the finger mounting stand 36 for holding the print finger U1.

Then, at the time of finger holding, the lift adjusting portion 819 controls the lifting mechanism 37, namely the push-pull solenoid, and causes the plunger 372 to protrude and move the finger mounting stand 36 to the set height position.

For example, for a print finger U1 with a finger width size classified as "size 1" by the finger size detection portion 813, the lift adjusting portion 819 causes the lifting mechanism 37 to operate and push the finger mounting stand 36 up such that the finger mounting stand 36 is at a height position (see FIG. 13A) where the distance from the top surface of the finger mounting stand 36 to the bottom surface of the finger holding portion 348 is 7 mm.

Additionally, upon completion of the drawing operations on the print finger U1 by the pen 41 and/or the ink jet head 71, the lift adjusting portion 819 retracts the plunger 372 of the lifting mechanism 37, reduces the height of the finger mounting stand 36, and releases the holding of the print finger U1. Thus, a state is achieved where the user can pull the print finger U1 out of the object receiver 33.

Note that other configurations are the same as in the first embodiment and, as such, the same reference signs are applied to the same constituents and descriptions thereof are omitted.

Next, finger holding processing and the like by the nail printing apparatus (drawing apparatus) 1 according to the present embodiment is described.

Note that the overall flow of the drawing processing by the nail printing apparatus (drawing apparatus) 1 is the same as in the first embodiment and, as such, description thereof is omitted.

In the present embodiment, when performing holding processing of the print finger U1, first, as in the first embodiment, the print finger U1 is imaged and the finger size detection portion 813 detects the finger width W as the size of the print finger U1 on the basis of the captured images.

Furthermore, the finger size detection portion 813 references the table stored in the height adjustment information memory region 825 and classifies (determines) which of the three finger width levels applies to the detected finger width W. For example, in a case where the print finger U1 is a middle finger and the detected finger width W is 13 mm, the finger width level is classified as "size 2".

Upon classification (determination) of the finger width level, the lift adjusting portion 819 references a table such as that shown in FIG. 12, reads the height level corresponding to the finger width level, and sets this height level as the height of the finger mounting stand 36 for holding the print finger U1. For example, continuing with the previous example, since the finger width level was classified (determined) as "size 2", the height level is set to 12 mm.

Then, the lift adjusting portion 819 causes the lifting mechanism 37 to operate and push the finger mounting stand 36 up to a height position where the distance from the top surface of the finger mounting stand 36 to the bottom surface of the finger holding portion 348 is 12 mm (that is, the height position illustrated in FIG. 13B). As a result, the print finger U1 is held at a position suitable for applying a drawing on the nail T.

The lift adjusting portion 819 controls the lifting mechanism 37 so as to hold the height position of the finger mounting stand 36 until the drawing processing on the nail T of the print finger U1 is finished. When the drawing processing is finished, the lift adjusting portion 819 causes the lifting mechanism 37 to operate and lower the finger mounting stand 36 to the lowest height position. Thus, the processing is finished. As a result, the finger mounting stand 36 is placed in a state in which the holding is released and, in this state, the user can remove the print finger U1 from the object receiver 31.

In the present embodiment, the finger mounting stand 36 is lifted or lowered via the spring 38 when the plunger 372 of the lifting mechanism 37 operates in the vertical direction shown in FIG. 9 and the like. At this time, the protrusions 362 of the finger mounting stand 36 are guided by the guide grooves 346 in the upper case 34 and, as such, the finger mounting stand 36 can be lifted and lowered stably without tilting or becoming displaced.

Note that other points are the same as in the first embodiment and, as such, descriptions thereof are omitted.

As described above, with the present embodiment, the following beneficial effects can be obtained in addition to the beneficial effects obtained in the first embodiment.

Specifically, in the present embodiment, the finger mounting stand 36 is lifted and lowered by the lifting mechanism 37 constituted by a push-pull solenoid of the like. As a result, the print finger U1 can be placed in a suitable held state.

As such, it is possible to make the configuration for holding the print finger U1 simple and small.

The embodiment described above is for the purpose of elucidating the present invention and is not to be construed as limiting the present invention. The invention can of course be altered and improved without departing from the gist thereof.

For example, in the embodiments described above, an example of a case is described in which the finger width W of the print finger U1 is used as the size of the print finger U1 when adjusting the holding level by the object holder at the time of holding the print finger U1 (specifically, when adjusting the internal pressure of the object holder 312 in the first embodiment; and when adjusting the height of the finger mounting stand 36 in the second embodiment). However, the size of the print finger U1 is not limited thereto.

For example, a configuration is possible in which a surface area of the finger tip portion of the print finger U1 when viewed from above is used as the size of the print finger U1 when adjusting the holding level by the object holder. Note that the specific region of the finger tip portion that is used is not particularly limited but, for example, a region of the finger more to the free end side of the nail T than the center portion (see FIG. 6) in the length direction of the nail T, or a region above (on the free end side of the finger) the first joint of the finger may be used as the fingertip portion of the print finger U1.

In this case, the holding level by the object holder is adjusted in accordance with the surface area of the finger tip portion of the print finger U1. Note that in cases where adjusting the internal pressure of the object holder 312 in accordance with the surface area of the fingertip portion, a table that defines correspondence between the surface area of the finger and area levels (that is, levels indicating if the area is large or small as a surface area of a finger) is prepared and stored in advance in the memory unit 82 (the pressure adjustment information memory region 824 in the first embodiment; and the height adjustment information memory region 825 in the second embodiment). For example, in a case of classifying into three area levels, thresholds of each of the levels are set and surface areas of the finger and area sizes are associated. For example, the surface area of the finger is associated with a "small size" when smaller than a certain threshold; the surface area of the finger is associated with a "large size" when larger than a certain threshold; and, the surface area of the finger is associated with a "medium size" when somewhere in between. Furthermore, a table that defines correspondence of holding levels (the pressure levels in the first embodiment; and the height levels in the second embodiment) to area sizes is provided, and the holding level (the pressure level (that is, the pressure value; unit: mmHg) in the first embodiment; and the height level (that is, the distance from the top surface of the finger mounting stand 36 to the bottom surface of the finger holding portion 348) in the second embodiment) is set such that the holding level (the inner pressure level of the object holder 312 in the first embodiment; and the height level of the finger mounting stand 36 in the second embodiment) by the object holder increases as the area size becomes smaller. Note that the number of levels is not limited to three and, as with the classification by finger width W described in the embodiments, more detailed classification is possible.

Additionally, in the case of the second embodiment, a configuration is possible in which, for example, the imaging unit 50 images from the side of the side surface of the print finger U1, and the finger size detection portion 813 calculates the thickness (height) of the print finger U1 from the captured images taken from the side of the side surface and categorizes the finger thickness level on the basis of the calculated thickness (height) of the finger.

In this case, a table that associates finger thickness levels with height levels is stored in advance in the height adjustment information memory region 825, and the finger thickness level detected (classified) by the finger size detection portion 813 is also stored.

Moreover, the lift adjusting portion 819 reads the height level corresponding to the finger thickness level, which was classified by the finger size detection portion 813, by referencing the table stored in the height adjustment information memory region 825 that associates finger thickness levels with height levels, and sets this height level as the height of the finger mounting stand 36 for holding the print finger U1.

In the second embodiment, because classification is by height level, adjusting the holding level of the print finger U1 by the object holder (the finger mounting stand 36 in the second embodiment) on the basis of the relationship with the thickness (height) of the finger is more effective than adjusting on the basis of the relationship with the lateral width of the finger.

It is assumed that the camera 51 provided in the imaging unit 50 described above in the embodiments is configured to capture images of the top surface side of the finger from above the print finger U1. As such, in the second embodiment, an example of a case is described in which the holding level of the print finger U1 is set under the assumption that the finger width is calculated from captured images of the top surface side of the print finger U1, the finger width level of the print finger U1 is classified and, if the finger width widens, the thickness (height) of the finger increases, and if the finger width narrows, the thickness (height) of the finger decreases.

However, as described above, in cases where a camera capable of imaging from the side of the side surface of the print finger U1 is provided in the apparatus, the thickness (height) of the finger is not estimated from finger width but, rather, the thickness (height) can be calculated directly. This is preferable because it is possible to more suitably adjust the holding level of the print finger U1 in accordance with the thickness (height) of the finger.

In cases where holding the print finger U1 by the object holder 312 for which the internal pressure can be adjusted such as in the first embodiment, the pressure applied to the print finger U1 changes depending on the contact area between the finger and the object holder 312. As such, the internal pressure of the object holder 312 can be more suitably adjusted in cases where the internal pressure of the object holder 312 has been adjusted at the time of holding the print finger U1 while taking the surface area of the fingertip portion as into consideration as described above.

To accurately know the pressure applied to the print finger U1, it is most preferable to measure the contact area between the print finger U1 (the underbelly portion of the finger) and the object holder 312 and use the resulting value.

On this point, in the present embodiment, due to the structure of the object receiver 31, the contacting portion of the print finger U1 (the underbelly portion of the finger) and the object holder 312 is hidden. As such, it is not possible to accurately acquire the area of the contacting portion by the imaging by the imaging unit 50. Therefore, for convenience, an example has been given of a case in which the value of the surface area of the fingertip portion of the portion exposed through the window 311*c* is used.

Note that, techniques enabling the acquisition of the contacting area of the print finger U1 (the underbelly portion of the finger) and the object holder 312 may be used. Examples of such techniques include forming the object receiver 31 from a transparent member, thus making it possible to measure the contacting area of the print finger U1 (the underbelly portion of the finger) and the object holder 312 from an image obtained by imaging using the imaging unit 50; disposing a contact sensor or the like in the object receiver 31, and acquiring the contacting range (contacting area) of the print finger U1 (the underbelly portion of the finger) and the object holder 312 from the contact sensor; and the like. In such cases, the internal pressure adjustment of the object holder 312 may be performed using this value.

Additionally, in the embodiments described above, an example of a case is described in which the size of the print finger U1 is classified into a plurality of levels such as three levels, and the holding level by the object holder at the time of holding the print finger U1 is adjusted (specifically, the internal pressure of the object holder 312 is adjusted in the first embodiment; and the height of the finger mounting stand 36 is adjusted in the second embodiment). However, the technique for adjusting the holding level by the object holder is not limited thereto and a configuration is possible in which adjustment of the holding level by the object holder is performed in a step-less manner in accordance with the size of the print finger U1, without classifying sizes into levels.

In this case, for example, in the first embodiment, the holding level is set to be equal to (the contacting area of the print finger U1 with the object holder 312)×(the internal pressure of the object holder 312). As a result, regardless of the size of the print finger U1, suitable finger holding, in which the force applied to the finger is substantially uniform, can be performed for all print fingers U1.

Additionally, in the present embodiment, an example of a case is described in which the size of the print finger U1 (the finger width W of the print finger U1 in the present embodiment) is acquired for the purpose of adjusting the holding level by the object holder (specifically, for adjusting the internal pressure of the object holder 312 in the first embodiment; and for adjusting the height of the finger mounting stand 36 in the second embodiment) each time the drawing operations are performed. However, the timing at which the size of the print finger U1 is acquired is not limited to each time the drawing operations are performed.

For example, a user may cause the size (e.g. the finger width W of the print finger U1) of each finger to be acquired by the nail printing apparatus 1 in advance such as when acquiring the apparatus, at the time of the first drawing, or the like; and these sizes may be recorded in the apparatus side memory unit 82 (the pressure adjustment information memory region 824 in the first embodiment; and the height adjustment information memory region 825 in the second embodiment) or the like.

In this case, when performing subsequent drawing operations, the suitable holding level for holding the print finger U1 will be read and the print finger U1 can be held by simply designating the finger intended as the drawing object. As a result, it is possible to reduce the processing speed.

Additionally, when recording in advance as described above, a table may be created in which each finger is associated with a specific holding level (the pressure level (that is, the internal pressure value of the object holder 312) in the first embodiment; and the height level in the second embodiment); and, in subsequent operations, the holding level may be set by referencing this table.

Additionally, instead of classifying the size of each finger into a plurality of levels and associating predetermined holding levels (the pressure levels (that is, the internal pressure values of the object holder 312) in the first embodiment; and the height levels in the second embodiment) therewith, holding levels (the pressure levels (that is, the internal pressure values of the object holder 312) in the first embodiment; and the height levels in the second embodiment) corresponding to each finger may be arbitrarily set afterwards by the user.

Each person feels the squeezing and holding of their fingers differently and, as such, using a configuration whereby each user can freely set the holding level on their own makes it possible to hold the print finger U1 with suitable squeezing that is not unpleasant and also does not allow the finger of the user to be easily removed.

Additionally, in the first embodiment, an example of a case is described in which the object holder 312 is formed from a center block 312*a* disposed on the bottom surface of the object receiver 31 (that is, the top side of the finger mount portion 310) and a pair of side blocks 312*b* disposed on either side of the object receiver 31. In this example, these three blocks are linked in a state whereby the inflow and outflow of fluid is possible, and the print finger U1 is held from three directions. However, the shape, configuration, and the like of the object holder 312 are not limited to those described herein.

For example, a configuration is possible in which the blocks are not linked so as to be in communication with each other and, instead, are made expandable and contractable by being connected individually to the pump 313.

Additionally, the object holder 312 in the first embodiment may be disposed only on the bottom surface of the object receiver 31 (that is, the top side of the finger mount portion 310). In this case as well, the print finger U1 can be pressed up by the expanding of the object holder 312.

Moreover, a portion or all of the object holder 312 may be disposed so as to be stacked in a plurality of stages.

Furthermore, the object holder 312 in the first embodiment may be configured as two blocks linked at roughly a center portion in the width direction, and disposed within the object receiver 31. In this case, in the expanded state where the internal pressure is increased, the object holder 312 substantially has a V-shape and holds the print finger U1 by sandwiching the print finger U1 from below.

Additionally, the object holder 312 may be a linked member formed such that, when in the expanded state where the internal pressure is increased, a cross-section thereof substantially has a vertical or horizontal U-shape. In this case as well, the object holder 312 can hold the print finger U1 from three directions, namely the bottom side and both side surfaces.

Note that the shape and configuration of the object holder 312 are not limited to the examples described herein, and any appropriate shape or configuration may be used.

Additionally, in the embodiments described above, a configuration is described in which the drawing head 43 of the nail printing apparatus (the drawing apparatus) 1 is provided with the pen holder 42 that holds the pen 41 for drawing and the ink jet head 71. However, providing both the pen 41 and the ink jet head 71 is not a required configuration and the drawing apparatus may be configured to draw using only the pen 41 or the ink jet head 71.

Additionally, in the embodiments described above, an example of a case is described in which the drawing head 43 is provided with one pen holder 42, but the number of pen holders 42 provided in the drawing head 43 is not limited to one. For example, a configuration is possible in which two or more pen holders 42 are provided and two or more pens 41 for drawing are held.

Additionally, in the embodiments described above, an example of a case is described in which the user manually appropriately replaces the pen 41 held in the pen holder 42. However, for example, a configuration is possible in which standby space for causing pens 41 to stand by is provided in the home area 60 or the like, a required pen 41 is automatically acquired from within the standby space by a pen replacing mechanism (not illustrated), and this pen 41 is placed in the pen holder 42.

Additionally, in the embodiments described above, an example of a case is described in which the cameras 51 and the illumination device 52 are fixedly disposed in the upper portion of the apparatus, but the positions at which the cameras 51 and the illumination device 52 are provided are not limited thereto.

For example, a configuration is possible in which the cameras 51 and the illumination device 52 are mounted on the drawing head 43, and are movable in the X-Y directions by the head movement portion 49.

Additionally, for example, a mechanism for moving the imaging unit 50 may be provided separately from the mechanism for moving the drawing head 43.

Thus, in cases where configuring the cameras 51 and the illumination device 52 to be movable, a configuration is possible in which only one of the camera 51 is provided and imaging is performed from a plurality of different positions and/or angles by moving the camera 51.

Additionally, in the embodiments described above, an example of the nail printing apparatus 1 in which one finger at a time is inserted and successive drawing is performed. However, a configuration is possible in which drawing is performed consecutively on a plurality of fingers without inserting and removing each finger.

The embodiment described above is not to be construed as limiting the scope of the present invention and include the scope of the invention recited in the claims and equivalents. It is obvious to a person skilled in the art that various modifications and improvements can be made to the specific embodiments described above, and it is obvious from the recitations of the claims that aspects including such modification and improvements are encompassed within the technical scope of the present invention.

The invention claimed is:

1. A drawing apparatus, comprising:
- an object receiver having an object holding case into which an object is inserted, the object being at least one finger or toe having a nail to be drawn;
- an object holder configured to hold the object inserted into the object receiver; and
- a processor configured to adjust a holding level by the object holder on the basis of a size of the object.

2. The drawing apparatus according to claim 1, further comprising:
- a camera configured to acquire an image of the object; wherein
- the processor is configured to detect the size of the object inserted into the object receiver from the image of the object acquired by the camera.

3. The drawing apparatus according to claim 1, wherein:
- the object holder is at least one bag-like member configured to be expandable and contractable by changing internal pressure and hold the object when in an expanded state; and
- the processor is configured to adjust the internal pressure of the object holder as the holding level, on the basis of the detected size of the object.

4. The drawing apparatus according to claim 3, wherein:
- the object receiver includes an opening through which the nail and a portion of the corresponding object are exposed;
- the camera is configured to acquire the image of the object by imaging the nail and the portion of the object visible through the opening of the object receiver;
- the size of the object detected by the processor is a width of the object in the image of the object or is a surface area of a tip portion of the object in the image; and
- the processor is configured to adjust the internal pressure of the object holder at a time of holding the object on the basis of the detected width of the object or the surface area of the tip portion of the object.

5. The drawing apparatus according to claim 4, wherein:
- the processor is configured to lower the internal pressure of the object holder as the detected width of the object or the surface area of the tip portion of the object increases.

6. The drawing apparatus according to claim 3, further comprising:
- a drawing device configured to apply a drawing from an upper surface of the object receiver to the nail of the object inserted into the object receiver and held by the object holder; wherein:
- the bag-like member is disposed on a bottom surface and on both side surfaces of the object receiver, and is configured to hold the object from three directions.

7. The drawing apparatus according to claim 1, wherein:
- the object holder includes a mounting stand disposed within the object receiver, on which the object is mounted, and a lifting mechanism configured to lift and lower the mounting stand; and the processor is configured to adjust a height of the mounting stand as the holding level, on the basis of the detected size of the object.

8. A drawing method for a drawing apparatus, comprising:

receiving an object inserted into an object holding case, the object being at least one finger or toe having a nail to be drawn;

holding the object that is received;

adjusting a holding level to hold the object on the basis of a size of the object.

9. The drawing method for a drawing apparatus according to claim 8, the drawing apparatus comprising:

a camera configured to acquire an image of the object, the drawing method further comprising:

detecting a size of the object from the image of the object acquired by the camera.

10. The drawing method for a drawing apparatus according to claim 8, the drawing apparatus comprising:

an object holder configured to hold the object inserted;

the object holder being configured to be expandable and contractable by changing internal pressure and hold the object when in an expanded state, the drawing method further comprising:

adjusting the internal pressure of the object holder as the holding level, on the basis of the detected size of the object.

11. The drawing method for a drawing apparatus according to claim 10, the drawing apparatus comprising:

a camera configured to acquire an image of the object and an object receiver configured to receive the object inserted;

the object receiver including an opening through which the nail and a portion of the corresponding object are exposed;

the camera being configured to acquire the image of the object by imaging the nail and the portion of the object visible through the opening of the object receiver; and the size of the object which is detected being a width of the object in the image or a surface area of a tip portion of the object in the image, the drawing method further comprising:

adjusting the internal pressure of the object holder at a time of holding the object on the basis of the detected width of the object or the surface area of the tip portion of the object.

12. The drawing method for a drawing apparatus according to claim 10, the drawing method further comprising:

lowering the internal pressure of the object holder as the detected width of the object or the surface area of the tip portion of the object increases.

13. The drawing method for a drawing apparatus according to claim 10, wherein:

the drawing apparatus further comprises:

an object receiver configured to receive the object inserted; and a drawing device configured to apply a drawing from an upper surface of the object receiver to the nail of the object inserted into the object receiver and held by the object holder; and the object holder is disposed on a bottom surface and on both side surfaces of the object receiver, and is configured to hold the object from three directions.

14. The drawing method for a drawing apparatus according to claim 8, the drawing apparatus further comprising:

an object receiver configured to receive the object inserted; and an object holder configured to hold the object inserted; and the object holder including a mounting stand disposed within the object receiver, on which the object is mounted, and a lifting mechanism configured to lift and lower the mounting stand, the drawing method further comprising:

adjusting a height of the mounting stand as the holding level, on the basis of the detected size of the object.

15. A non-transitory computer readable recording medium storing a program for a drawing apparatus, the drawing apparatus comprising:

an object receiver having an object holding case into which an object is inserted, the object being at least one finger or toe having a nail to be drawn; and an object holder configured to hold the object inserted into the object receiver;

the program causing a computer to execute: adjust a holding level by the object holder at a time of holding the object on the basis of a size of the object.

16. The non-transitory computer readable recording medium according to claim 15, wherein:

the object holder is configured to be expandable and contractable by changing internal pressure and hold the object when in an expanded state; and the program further causing the computer to execute: adjust the internal pressure of the object holder as the holding level, on the basis of the detected size of the object.

17. The non-transitory computer readable recording medium according to claim 16, the drawing apparatus further comprising a camera configured to acquire an image of the object by imaging the object; wherein the object receiver includes an opening through which the nail and a portion of the corresponding object are exposed;

the camera being configured to acquire the image of the object by imaging the nail and the portion of the object visible through the opening of the object receiver; and the size of the object which is detected being a width of the object in the image of the object or is a surface area of a tip portion in the image of the object, the program further causing the computer to execute: adjust the internal pressure of the object holder at a time of holding the object on the basis of the detected width of the object or the surface area of the tip portion of the object.

18. The non-transitory computer readable recording medium according to claim 17, the program further causing the computer to execute:lower the internal pressure of the object holder as the detected width of the object or the surface area of the tip portion of the object increases.

19. The non-transitory computer readable recording medium according to claim 16, wherein:

the drawing apparatus further comprises:

a drawing device configured to apply a drawing from an upper surface of the object receiver to the nail of the object inserted into the object receiver and held by the object holder; and the object holder is disposed on a bottom surface and on both side surfaces of the object receiver, and is configured to hold the object from three directions.

20. The non-transitory computer readable recording medium according to claim 15, wherein:

the object holder includes a mounting stand disposed within the object receiver, on which the object is mounted, and a lifting mechanism configured to lift and lower the mounting stand; and the program further causing the computer to execute: adjust a height of the mounting stand as the holding level, on the basis of the detected size of the object.

* * * * *